(12) United States Patent (10) Patent No.: US 8,786,623 B2
Kanai (45) Date of Patent: Jul. 22, 2014

(54) IMAGE PROCESSOR, IMAGE DISPLAY DEVICE, IMAGE PROCESSING METHOD, AND IMAGE DISPLAY METHOD

(75) Inventor: Masashi Kanai, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 1215 days.

(21) Appl. No.: 12/548,981

(22) Filed: Aug. 27, 2009

(65) Prior Publication Data

US 2010/0060794 A1 Mar. 11, 2010

(30) Foreign Application Priority Data

Sep. 8, 2008 (JP) ................................ 2008-229476

(51) Int. Cl.
*G09G 5/02* (2006.01)
*H04N 9/66* (2006.01)
*H04N 9/73* (2006.01)
*G06K 9/00* (2006.01)

(52) U.S. Cl.
USPC ........... 345/589; 348/638; 348/658; 382/162; 382/167

(58) Field of Classification Search
CPC .. H04N 5/57; G09G 5/02; G09G 5/022–5/06; G09G 2320/0626
USPC ............ 345/589; 348/638–658; 382/162, 167
See application file for complete search history.

(56) References Cited

U.S. PATENT DOCUMENTS

| | | | |
|---|---|---|---|
| 6,701,024 B1 * | 3/2004 | Sasai | ............................ 382/260 |
| 6,791,565 B2 | 9/2004 | Kanai | |
| 6,894,697 B2 | 5/2005 | Matsuda | |
| 7,418,129 B2 | 8/2008 | Komori | |
| 7,486,304 B2 | 2/2009 | Bergquist et al. | |
| 7,545,397 B2 | 6/2009 | O'Dea et al. | |
| 7,551,334 B2 | 6/2009 | Li | |
| 7,710,474 B2 | 5/2010 | Hatano | |
| 7,903,148 B2 | 3/2011 | Yokoyama et al. | |
| 8,050,515 B2 | 11/2011 | Chen | |
| 8,452,121 B2 | 5/2013 | Kanai | |
| 2003/0020725 A1 | 1/2003 | Matsuda | |
| 2005/0141778 A1 | 6/2005 | Nakajima et al. | |
| 2006/0256217 A1 | 11/2006 | Hatano | |
| 2007/0080975 A1 * | 4/2007 | Yamashita et al. | ............ 345/591 |

(Continued)

FOREIGN PATENT DOCUMENTS

| | | |
|---|---|---|
| EP | 1 345 172 A1 | 9/2003 |
| JP | A 2002-077667 | 3/2002 |

(Continued)

OTHER PUBLICATIONS

European Search Report issued in Application No. 09169715.1 on Jan. 20, 2010.

(Continued)

*Primary Examiner* — Xiao Wu
*Assistant Examiner* — Scott E Sonners
(74) *Attorney, Agent, or Firm* — Oliff PLC

(57) ABSTRACT

An image processor that corrects an image signal, includes: a brightness component correction amount calculating section that calculates the amount of correction of a brightness component of the image signal only for an image signal in a predetermined brightness level range of a predetermined spatial frequency band; and a brightness component correcting section that corrects the brightness component of the image signal by using the amount of correction calculated by the brightness component correction amount calculating section.

13 Claims, 19 Drawing Sheets

(56) References Cited

U.S. PATENT DOCUMENTS

| | | | |
|---|---|---|---|
| 2007/0109317 A1 | 5/2007 | Minakuchi et al. | |
| 2007/0109447 A1 | 5/2007 | Yamashita et al. | |
| 2007/0177030 A1* | 8/2007 | Yokoyama et al. | ........ 348/222.1 |
| 2010/0060794 A1 | 3/2010 | Kanai | |

FOREIGN PATENT DOCUMENTS

| | | |
|---|---|---|
| JP | A-2002-091415 | 3/2002 |
| JP | A-2004-32427 | 1/2004 |
| JP | A-2004-252620 | 9/2004 |
| JP | A-2004-266755 | 9/2004 |
| JP | A-2006-121713 | 5/2006 |
| JP | A-2006-148607 | 6/2006 |
| JP | A-2006-166032 | 6/2006 |
| JP | A 2007-142500 | 6/2007 |
| JP | A-2007-208399 | 8/2007 |
| JP | A-2007-306505 | 11/2007 |
| KR | 2003-0070845 | 9/2003 |

OTHER PUBLICATIONS

U.S. Appl. No. 12/641,938 filed Dec. 18, 2009.
U.S. Appl. No. 12/603,200 filed Oct. 21, 2009, now U.S. Pat. No. 8,452,121 B2.
Sep. 11, 2012 Office Action issued in U.S. Appl. No. 12/641,938.
Nov. 20, 2012 Office Action issued in U.S. Appl. No. 12/641,938.
Mar. 11, 2013 Office Action issued in U.S. Appl. No. 12/641,938.
Jan. 15, 2013 Office Action issued in U.S. Appl. No. 12/603,200.
Mar. 12, 2013 Notice of Allowance issued in U.S. Appl. No. 12/603,200.
Apr. 11, 2013 Supplemental Notice of Allowability issued in U.S. Appl. No. 12/603,200.
Sep. 26, 2012 Office Action issued in U.S. Appl. No. 12/603,200.

* cited by examiner

| FILTER OUTPUT | | | WEIGHT COEFFICIENT | | |
|---|---|---|---|---|---|
| FO1a | FO2a | FO3a | g1a | g2a | g3a |
| FO1a | FO2a | FO3b | g1b | g2b | g3b |
| FO1a | FO2b | FO3c | g1c | g2c | g3c |
| ...... | ...... | ...... | ...... | ...... | ...... |

FIG. 7

| INPUT BRIGHTNESS SIGNAL | BRIGHTNESS GAIN |
|---|---|
| Ya | ha |
| Yb | hb |
| Yc | hc |
| ......... | ......... |

| INPUT BRIGHTNESS SIGNAL | BRIGHTNESS GAIN |
|---|---|
| Ya | j1a |
| Yb | j1b |
| Yc | j1c |
| ⋮ | ⋮ |

FIG. 16B

| INPUT BRIGHTNESS SIGNAL | BRIGHTNESS GAIN |
|---|---|
| Ya | j2a |
| Yb | j2b |
| Yc | j2c |
| ⋮ | ⋮ |

FIG. 16C

| INPUT BRIGHTNESS SIGNAL | BRIGHTNESS GAIN |
|---|---|
| Ya | j3a |
| Yb | j3b |
| Yc | j3c |
| ⋮ | ⋮ |

| INPUT BRIGHTNESS SIGNAL | FILTER OUTPUT | | | OUTPUT OF AMOUNT OF CORRECTION |
|---|---|---|---|---|
| Ya | FO1a | FO2a | FO3a | VAa |
| Ya | FO1a | FO2a | FO3b | VAb |
| ⋮ | ⋮ | ⋮ | ⋮ | ⋮ |
| Yb | FO1a | FO2b | FO3a | VAc |
| Yb | FO1a | FO2b | FO3b | VAd |
| Yb | FO1a | FO2b | FO3c | VAe |
| ⋮ | ⋮ | ⋮ | ⋮ | ⋮ |

FIG. 18

IMAGE PROCESSOR, IMAGE DISPLAY DEVICE, IMAGE PROCESSING METHOD, AND IMAGE DISPLAY METHOD

BACKGROUND

1. Technical Field

The present invention relates to an image processor, an image display device, an image processing method, and an image display method.

2. Related Art

In recent years, as the number of gray levels or the dynamic range of image contents increases, some dark or bright portions of a display image cannot be expressed due to insufficient contrast in a display device. Accordingly, the cases are increasing where the detail in dark or bright portions cannot be completely reproduced. In order to express such detail in the dark or bright portions, image-adaptive gray level correction processing called monochrome extension is performed.

FIG. 19 is a view for explaining the gray level correction processing. FIG. 19 schematically shows the characteristic of an image expressed by each image signal under gray level correction processing, where the horizontal axis indicates the horizontal position of the image and the vertical axis indicates the brightness level.

An input image IMG1 is an image with low brightness (low gray level) at the left side and high brightness (high gray level) at the right side. In the input image IMG1, there is a small gray level change both in the region where the brightness is low and the region where the brightness is high. When performing the gray level correction processing on the input image IMS1, gray level correction is performed according to a gamma correction curve which is convex upward so that the overall brightness is increased, as shown in FIG. 19. As a result, in an output image IMG2 after the gray level correction, brightness has increased over the whole screen. Accordingly, the brightness has increased in the left low-brightness region, but the average brightness also increases in the low-brightness regions.

Thus, in the known gray level correction processing, a small gray level change in a dark portion can be expressed by increasing the overall brightness so that the brightness on the low gray level side is increased, for example, when the dark portion is included in the image. On the other hand, a small gray level change in a bright portion can be expressed by decreasing the overall brightness so that the brightness on the high gray level side is decreased, for example, when the bright portion is included in the image.

The technique related to such gray level correction processing is disclosed in JP-A-2004-266755, for example. JP-A-2004-266755 discloses the technique of calculating the gamma correction curve according to the average brightness of an input image and performing brightness correction of the input image according to the gamma correction curve. In the technique disclosed in JP-A-2004-266755, the brightness gain after correction increases as the average brightness of the input image decreases. In addition, when the input image is a moving image, flickering of the moving image after correction is suppressed by calculating the gamma correction curve on the basis of the linear sum of the average brightness of the screen and the average brightness of the previous frame.

In the technique disclosed in JP-A-2004-266755, however, since the brightness correction is uniformly performed on the whole screen, there is a problem that not only the detail in dark portions but also the whole of the dark portions or other brightness regions are expressed brightly. For this reason, when dark and bright portions are mixed, the detail in the dark portions can be expressed but the detail in the bright portions cannot be expressed, for example.

Moreover, in the technique disclosed in JP-A-2004-266755, since only the brightness component is corrected, the chromaticity of each pixel changes and the tendency of the colors on the whole screen accordingly changes. In this case, the quality of the image may deteriorate only with the correction of a brightness component. Accordingly, it is desirable to be able to maintain the tendency of the colors on the whole screen when expressing the detail of the image.

SUMMARY

An advantage of some aspects of the invention is that it provides an image processor, an image display device, an image processing method, and an image display method capable of improving the expression of the detail of an image without affecting the other brightness regions.

According to an aspect of the invention, an image processor that corrects an image signal includes: a brightness component correction amount calculating section that calculates the amount of correction of a brightness component of the image signal only for an image signal in a predetermined brightness level range of a predetermined spatial frequency band; and a brightness component correcting section that corrects the brightness component of the image signal by using the amount of correction calculated by the brightness component correction amount calculating section.

According to the aspect of the invention, the brightness component of the image signal is corrected only for the image signal in the predetermined brightness level range of the predetermined spatial frequency band. Accordingly, even in the case where dark and bright portions are mixed, the image signal can be corrected such that the detail of both the dark and bright portions can be expressed without uniformly correcting the whole screen.

According to the aspect of the invention, an image processor that corrects an image signal includes: a brightness component correction amount calculating section that calculates the amount of correction of a brightness component of the image signal in a predetermined spatial frequency band; and a brightness component correcting section that corrects the brightness component of the image signal by using the amount of correction calculated by the brightness component correction amount calculating section. The amount of correction in region having a predetermined brightness level is larger than the amount of correction in the other region.

According to the aspect of the invention, the brightness component of the image signal is corrected in predetermined spatial frequency band. The amount of correction in region having a predetermined brightness level is larger than the amount of correction in the other region. Accordingly, even in the case where dark and bright portions are mixed, the image signal can be corrected such that the detail of both the dark and bright portions can be expressed without uniformly correcting the whole screen.

Moreover, the image processor according to the aspect of the invention may further include a color difference component correcting section which corrects the color difference component of the image signal such that the value of xy chromaticity does not change before and after correction using the brightness component correcting section.

According to the aspect of the invention, the color difference component is corrected simultaneously with the correction of the brightness component such that the value of xy chromaticity does not change before and after correction of the brightness component. As a result, since it is possible to avoid the situation where the chromaticity of each pixel changes and the tendency of the overall colors on the screen accordingly changes in addition to the above-described effects, the tendency of the colors on the whole screen can be maintained when expressing the detail of the image.

Moreover, the image processor according to the aspect of the invention may further include a color difference component correction amount calculating section which calculates the amount of correction of the color difference component of the image signal, such that the value of xy chromaticity does not change, on the basis of the brightness components of the image signal before and after correction using the brightness component correcting section. The color difference component correcting section may correct the color difference component of the image signal by using the amount of correction of the color difference component calculated by the color difference component correction amount calculating section.

According to the aspect of the invention, the color difference component is corrected according to the amount of correction of the brightness component simultaneously with the correction of the brightness component of the image signal. As a result, correction of the image signal capable of expressing the detail of the dark or bright portions of the image becomes possible without changing the value of xy chromaticity before and after correction of the brightness component.

Moreover, the image processor according to the aspect of the invention may further include an adjustment parameter storage section that stores an adjustment parameter of the color difference component. Assuming that the brightness component before correction is Yin, the brightness component after correction is Yout, and the adjustment parameter is b, the color difference component correcting section may correct the color difference component by multiplying the color difference component of the image signal by a color difference gain of $(1-b \times (1-Yout/Yin))$.

According to the aspect of the invention, correction of the color difference component performed simultaneously with the correction of the brightness component of the image signal can be realized by a simple process.

Moreover, the image processor according to the aspect of the invention may further include a signal extracting circuit that extracts a signal in the spatial frequency band from the brightness component of the image signal. The brightness component correction amount calculating section may include a brightness gain calculating circuit, which calculates the brightness gain corresponding to the level of the brightness component of the image signal, and may calculate the amount of correction of the brightness component on the basis of the signal in the spatial frequency band extracted by the signal extracting circuit and the brightness gain calculated by the brightness gain calculating circuit.

According to the aspect of the invention, the signal in the predetermined spatial frequency band can be extracted by the signal extracting circuit, and the signal in the level range of the predetermined brightness component can be specified by the brightness gain calculating circuit. As a result, the brightness component of the image signal can be corrected only for the image signal in the predetermined brightness level range of the predetermined spatial frequency band by using a simple configuration.

Moreover, the image processor according to the aspect of the invention may further include a multi-stage filter circuit that extracts a signal in the predetermined spatial frequency band from the brightness component of the image signal. The brightness component correction amount calculating section may include a plurality of tables which is provided for every output of the multi-stage filter circuit and outputs the gain corresponding to the level of the brightness component before correction, a plurality of multipliers which is provided for every output of the multi-stage filter circuit and performs multiplication of the output of the multi-stage filter circuit and the output of each of the plurality of tables, and an adder which adds the multiplication results of the plurality of multipliers and may calculate the output of the adder as the amount of correction of the brightness component.

According to the aspect of the invention, when correcting the brightness component of the image signal only for the image signal in the predetermined brightness level range of the predetermined spatial frequency band, the gain is output from the plurality of tables provided for every output of the multi-stage filter circuit. As a result, since the number of multipliers can be reduced, it becomes possible to reduce power consumption and cost.

Moreover, the image processor according to the aspect of the invention may further include a signal extracting circuit that extracts a signal in the spatial frequency band from the brightness component of the image signal. The brightness component correction amount calculating section may include a table which outputs the amount of correction of the brightness component corresponding to the output of the signal extracting circuit and the level of the brightness component before correction.

According to the aspect of the invention, when correcting the brightness component of the image signal only for the image signal in the predetermined brightness level range of the predetermined spatial frequency band, the amount of correction of the brightness component is output from the table. As a result, since the multiplier can be removed, it becomes possible to significantly reduce power consumption and cost.

Furthermore, according to another aspect of the invention, an image display device that displays an image on the basis of an image signal includes: the above-described image processor that corrects the image signal; and an image display unit that displays an image on the basis of the image signal corrected by the image processor.

According to the aspect of the invention, it is possible to provide an image display device capable of improving the expression of the detail of an image without affecting the other brightness regions.

Furthermore, according to still another aspect of the invention, an image display device that displays an image on the basis of an image signal includes: an image processing unit that corrects an image signal of an image in which a spatial frequency changes in a first direction of the image, the level of a brightness component of the image signal changes in a second direction crossing the first direction, and an AC component of the brightness component is entirely uniform; and an image display unit that displays an image on the basis of the image signal corrected by the image processor. The image display unit displays an image in which the AC component of the brightness is not uniform over a predetermined brightness level range of a predetermined spatial frequency band.

According to the aspect of the invention, the brightness component of the image signal is corrected only for the image signal in the predetermined brightness level range of the predetermined spatial frequency band. As a result, it is possible to provide an image display device capable of improving the expression of the detail of an image without affecting the other brightness regions.

Furthermore, according to still another aspect of the invention, an image processing method of correcting an image signal includes: calculating the amount of correction of a brightness component of the image signal only for an image signal in a predetermined brightness level range of a predetermined spatial frequency band; and correcting the brightness component of the image signal by using the amount of correction calculated in the calculating of the amount of correction of the brightness component.

According to the aspect of the invention, the brightness component of the image signal is corrected only for the image signal in the predetermined brightness level range of the predetermined spatial frequency band. Accordingly, even in the case where dark and bright portions are mixed, the image signal can be corrected such that the details of both the dark and bright portions can be expressed without uniformly correcting the whole screen.

Moreover, the image processing method according to the aspect of the invention may further include correcting the color difference component of the image signal such that the value of xy chromaticity does not change before and after correction in the correcting of the brightness component.

According to the aspect of the invention, the color difference component is corrected simultaneously with the correction of the brightness component such that the value of xy chromaticity does not change before and after correction of the brightness component. As a result, since it is possible to avoid the situation where the chromaticity of each pixel changes and the tendency of the overall colors on the screen accordingly changes in addition to the above-described effects, the tendency of the colors on the whole screen can be maintained when expressing the detail of the image.

Moreover, the image processing method according to the aspect of the invention may further include calculating the amount of correction of the color difference component of the image signal such that the value of xy chromaticity does not change on the basis of the brightness components of the image signal before and after correction in the correcting of the brightness component. In the correcting of the color difference component, the color difference component of the image signal may be corrected using the amount of correction of the color difference component calculated in the calculating of the amount of correction of the color difference component.

According to the aspect of the invention, the color difference component is corrected according to the amount of correction of the brightness component simultaneously with the correction of the brightness component of the image signal. As a result, correction of the image signal capable of expressing the detail of the dark or bright portion of the image becomes possible without changing the value of xy chromaticity before and after correction of the brightness component.

Moreover, the image processing method according to the aspect of the invention may further include extracting a signal in a predetermined spatial frequency band from the brightness component of the image signal. In the calculating of the amount of correction of the brightness component, calculating the brightness gain corresponding to the level of the brightness component of the image signal may be included, and the amount of correction of the brightness component may be calculated on the basis of the signal in the spatial frequency band extracted in the extracting of the signal and the brightness gain calculated in the calculating of the brightness gain.

According to the aspect of the invention, the signal in the predetermined spatial frequency band can be extracted in the extracting of the signal, and the signal in the level range of the predetermined brightness component can be specified in the calculating of the brightness gain. As a result, the brightness component of the image signal can be corrected only for the image signal in the predetermined brightness level range of the predetermined spatial frequency band by the simple processing.

Furthermore, according to still another aspect of the invention, an image display method of displaying an image on the basis of an image signal includes: calculating the amount of correction of a brightness component of the image signal only for an image signal in a predetermined brightness level range of a predetermined spatial frequency band; correcting the brightness component of the image signal by using the amount of correction calculated in the calculating of the amount of correction of the brightness component; and displaying an image on the basis of the image signal corrected in the correcting of the brightness component.

According to the aspect of the invention, it is possible to provide an image display method capable of improving the expression of the detail of an image without affecting the other brightness regions.

Furthermore, according to still another aspect of the invention, an image display method of displaying an image on the basis of an image signal includes: calculating the amount of correction of a brightness component of the image signal in a predetermined spatial frequency band; correcting the brightness component of the image signal by using the amount of correction calculated in the calculating of the amount of correction of the brightness component; and displaying an image on the basis of the image signal corrected in the correcting of the brightness component. The amount of correction in region having a predetermined brightness level is larger than the amount of correction in the other region.

According to the aspect of the invention, it is possible to provide an image display method capable of improving the expression of the detail of an image without affecting the other brightness regions.

Furthermore, according to still another aspect of the invention, an image display method of displaying an image on the basis of an image signal includes: performing image processing for correcting an image signal of an image in which a spatial frequency changes in a first direction of the image, the level of a brightness component of the image signal changes in a second direction crossing the first direction, and an AC component of the brightness component is entirely uniform; and displaying an image on the basis of the image signal corrected in the performing of the image processing. In the displaying of the image, an image is displayed in which the AC component of the brightness is not uniform over a predetermined brightness level range of a predetermined spatial frequency band.

According to the aspect of the invention, the brightness component of the image signal is corrected only for the image signal in the predetermined brightness level range of the predetermined spatial frequency band. As a result, it is possible to provide an image display method capable of improving the expression of the detail of an image without affecting the other brightness regions.

BRIEF DESCRIPTION OF THE DRAWINGS

The invention will be described with reference to the accompanying drawings, wherein like numbers reference like elements.

FIG. 7 is a view for explaining an operation of a weight calculating circuit in FIG. 6.

FIG. 8 is a view for explaining an operation of a brightness gain calculating circuit in FIG. 6.

FIGS. 16A to 16C are views for explaining operations of first to third LUTs in FIG. 15.

FIG. 18 is a view for explaining an operation of an LUT in FIG. 17.

DESCRIPTION OF EXEMPLARY EMBODIMENTS

Hereinafter, embodiments of the invention will be described in detail with reference to the accompanying drawings. In addition, the embodiments described below are not intended to limit the contents of the invention defined by the appended claims. In addition, all of the configurations described below are not necessarily essential components of the invention.

Hereinafter, a projector is described as an example of an image display device of the invention. However, the image display device of the invention is not limited to the projector.

First Embodiment

Figure 1:
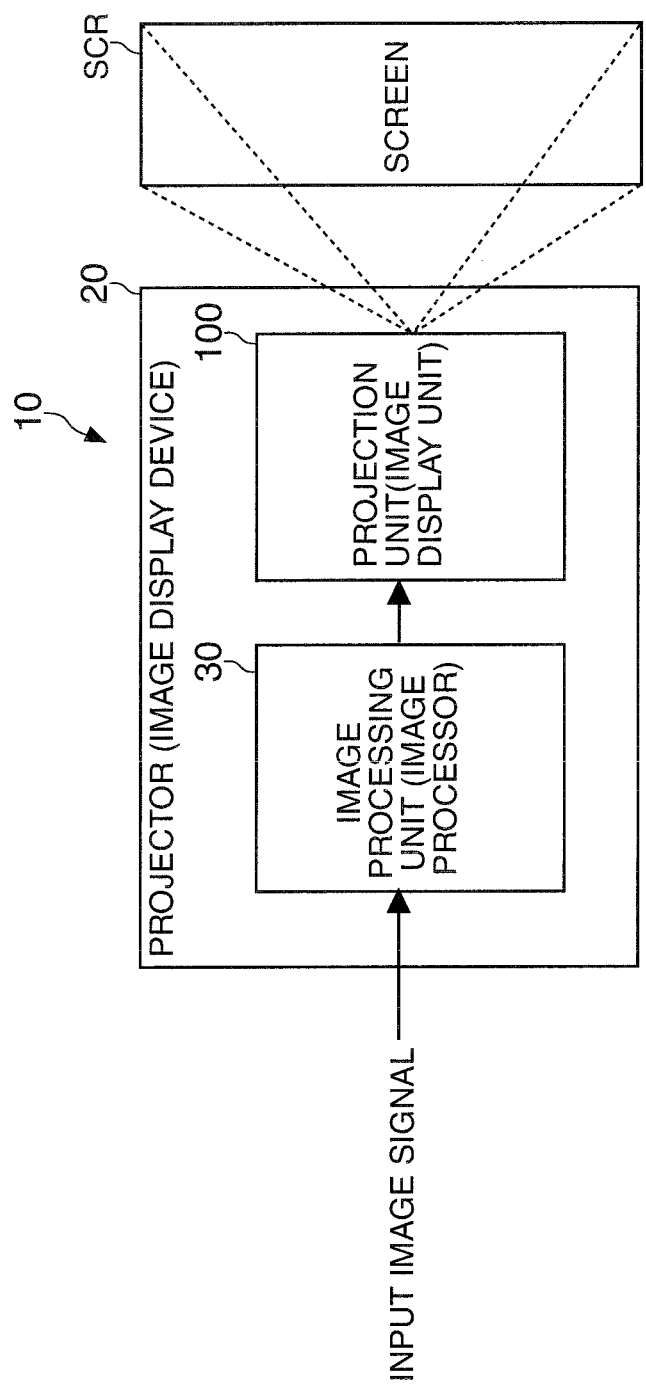
FIG. 1 is a block diagram illustrating an example of the configuration of an image display system according to a first embodiment of the invention.

FIG. 1 is a block diagram illustrating an example of the configuration of an image display system according to a first embodiment of the invention.

An image display system 10 includes a projector 20 and a screen SCR. The projector 20 modulates light from a light source (not shown) on the basis of an input image signal and displays an image by projecting the modulated light on the screen SCR.

The projector 20 includes an image processing unit 30 (in a broad sense, an image processor) and a projection unit 100 (in a broad sense, an image display unit). The image processing unit 30 corrects an input image signal so that the detail of dark or bright portions of a display image can be expressed without affecting the other brightness regions, and outputs the corrected image signal to the projection unit 100. The projection unit 100 projects onto the screen SCR the light modulated on the basis of the image signal from the image processing unit 30.

Figure 2:
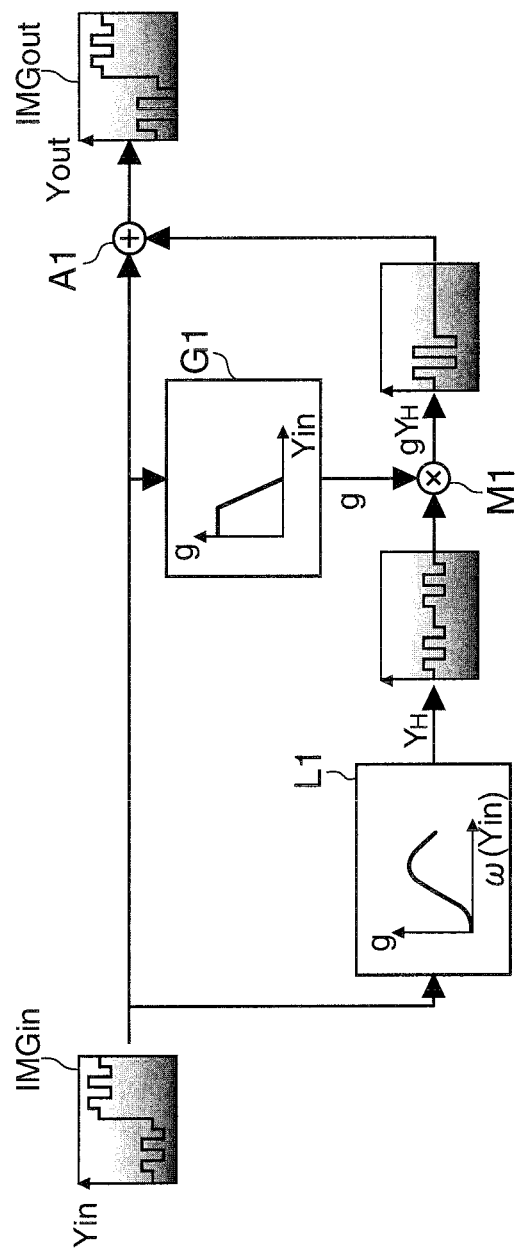
FIG. 2 is an explanatory view illustrating the gray level correction processing performed in an image processing unit in FIG. 1.

FIG. 2 is an explanatory view illustrating the gray level correction processing performed in the image processing unit 30 in FIG. 1. FIG. 2 schematically shows the characteristics of an image expressed by each image signal under the gray level correction processing, where the horizontal axis indicates the horizontal position of the image and the vertical axis indicates the brightness level.

An input image IMGin is, for example, an image with low brightness (low gray level) at the left side and high brightness (high gray level) at the right side. In the input image IMGin, there is a small gray level change both in the region where the brightness is low and the region where the brightness is high. A signal extracting unit L1 extracts a signal $Y_H$ of a brightness component in a predetermined spatial frequency band from the brightness components of the image signal of the input image IMGin. In FIG. 2, the gain is set corresponding to the spatial frequency and the signal extracting unit L1 extracts the signal $Y_H$ of the brightness component in the spatial frequency band where this gain is large.

In addition, a brightness gain calculating unit G1 calculates a gain coefficient g corresponding to the level of the brightness component of the image signal in the input image. In FIG. 2, the brightness gain calculating unit G1 calculates the gain coefficient g such that the gain coefficient g increases in the region where the level of the brightness component is low and the gain coefficient g is almost 0 in the region where the level of the brightness component is high.

As a result, a multiplier M1 generates a signal $gY_H$ by multiplying the signal $Y_H$ extracted by the signal extracting unit L1 by the gain coefficient g calculated by the brightness gain calculating unit G1. The signal $gY_H$ is a signal corresponding to the amount of correction of a brightness component of an input image signal. An adder A1 adds together a brightness component Yin and the signal $gY_H$ of the input image signal and outputs a brightness component Yout of the image signal after the gray level correction.

Figure 3:
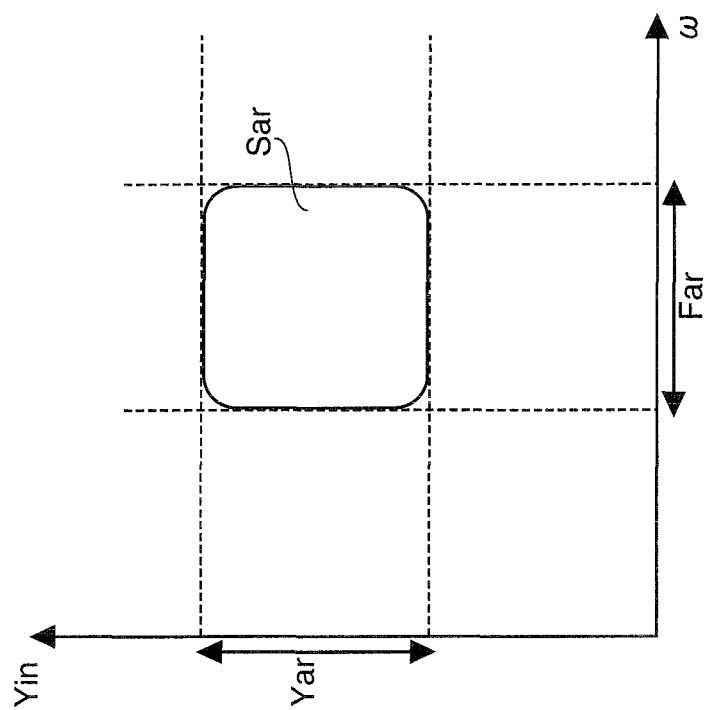
FIG. 3 is a view for explaining an operation of the image processing unit in FIG. 1.

FIG. 3 is a view for explaining an operation of the image processing unit 30 in FIG. 1. In FIG. 3, the vertical axis indicates the brightness component of an input image signal and the horizontal axis indicates the spatial frequency of the brightness component.

The image processing unit 30 in FIG. 1 calculates the amount of correction of a brightness component of an image signal only in a spatial frequency band Far (predetermined spatial frequency band) and corrects the brightness component of the image signal by using the amount of the correction. More specifically, the image processing unit 30 performs the gray level correction of a signal in a predetermined level range Yar (range Sar in FIG. 3) of the brightness component Yin of the input image signal, which has been calculated by the brightness gain calculating unit G1, in the spatial frequency band Far extracted by the signal extracting unit L1. As a result, the brightness component can be changed only in the spatial frequency band Far extracted by the signal extracting unit L1 and the predetermined level range Yar of the brightness component Yin of the input image signal calculated by the brightness gain calculating unit G1 without changing the tendency of the overall brightness.

Since the spatial frequency band extracted by the signal extracting unit L1 or the level range of the brightness component where the gain coefficient g is calculated by the brightness gain calculating unit G1 can each be designated, the change in brightness of the input image signal can be increased only in the designated level range of the brightness component of the designated spatial frequency band. Accordingly, for example, by increasing the brightness gain coefficient for a brightness component with low brightness, which is a dark portion, in the brightness gain calculating unit G1, the detail of the dark portion can be expressed without reducing the brightness range of other gray levels. In addition, the whole screen is not uniformly corrected. Accordingly, even in the case where dark and bright portions are mixed, the detail of both the dark and bright portions can be expressed without uniformly increasing the brightness of the dark portion or uniformly decreasing the brightness of the bright portion.

Hereinafter, an example of the configuration of the projector 20 in the first embodiment for realizing such gray level correction will be described in detail. An example in which an image signal is formed by a brightness signal Y and color difference signals U and V will be described below. However, an image signal in the invention is not limited thereto.

Figure 4:
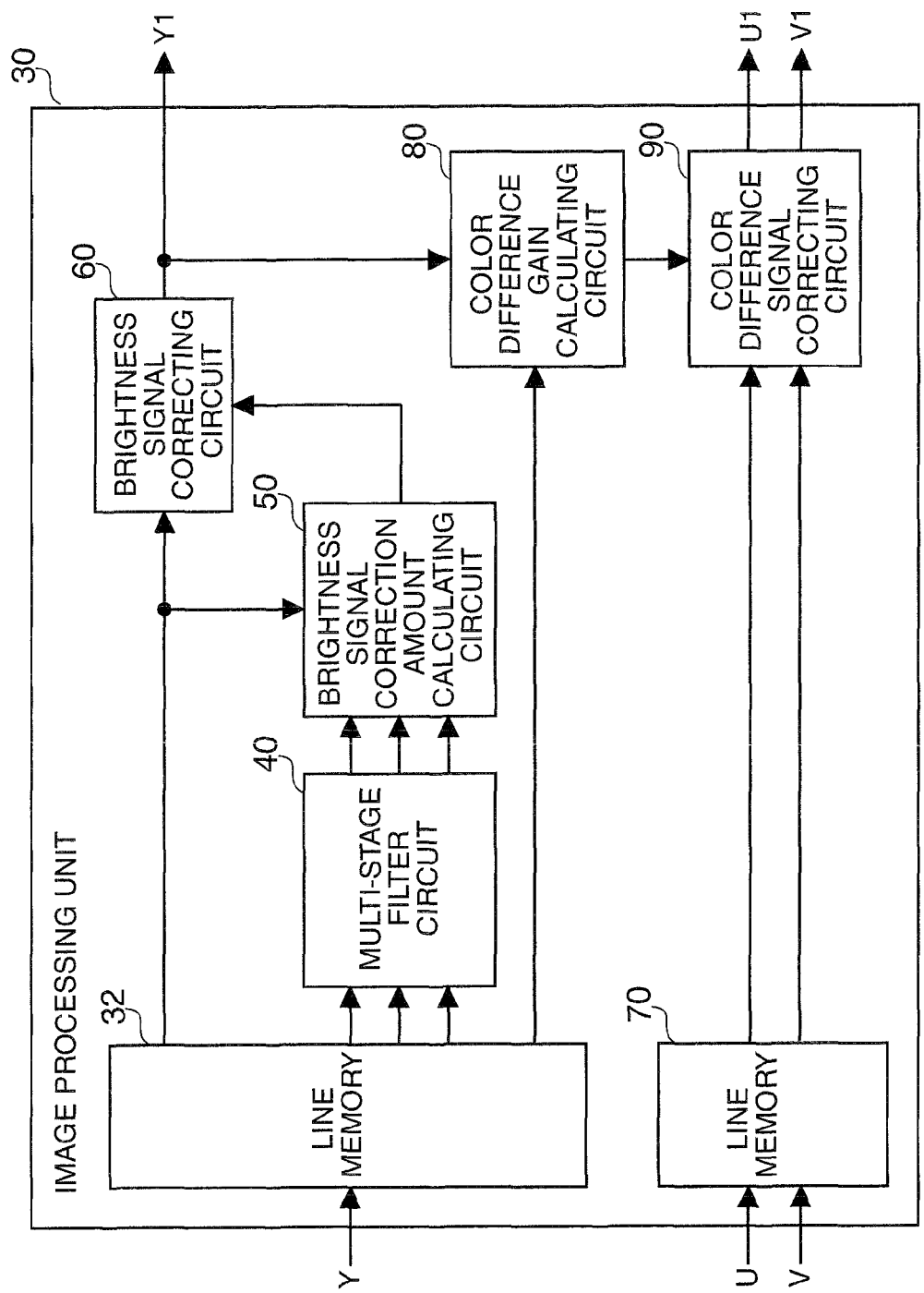
FIG. 4 is a block diagram illustrating an example of the hardware configuration of the image processing unit in FIG. 1.

FIG. 4 is a block diagram illustrating an example of the hardware configuration of the image processing unit 30 in FIG. 1.

The image processing unit 30 includes a line memory 32, a multi-stage filter circuit (signal extracting circuit) 40, a brightness signal correction amount calculating circuit (brightness component correction amount calculating section) 50, and a brightness signal correcting circuit (brightness component correcting section) 60. In addition, the image processing unit 30 includes a line memory 70, a color difference gain calculating circuit (color difference component correction amount calculating section) 80, and a color difference signal correcting circuit (color difference component correcting section) 90.

The line memory 32 stores a brightness signal Y (brightness component of an input image signal) which forms an input image signal. The line memory 32 stores the brightness signal Y corresponding to the number of lines required in the multi-stage filter circuit 40.

The multi-stage filter circuit 40 extracts a signal in the predetermined spatial frequency band from the brightness signal Y (brightness component of the image signal) stored in the line memory 32. The multi-stage filter circuit 40 can realize a function of the signal extracting unit L1 in FIG. 2.

The brightness signal correction amount calculating circuit 50 calculates the amount of correction of the brightness signal on the basis of an output of the multi-stage filter circuit 40 and the brightness signal stored in the line memory 32. The brightness signal correction amount calculating circuit 50 can calculate the amount of correction for the brightness signal in a predetermined brightness level range of the brightness signals in the predetermined spatial frequency band extracted by the multi-stage filter circuit 40. The brightness signal correction amount calculating circuit 50 can realize a function of the brightness gain calculating unit G1 in FIG. 2.

The brightness signal correcting circuit 60 corrects the brightness signal stored in the line memory 32 using the amount of correction calculated by the brightness signal correction amount calculating circuit 50 and outputs it as a corrected brightness signal Y1.

In addition, the image processing unit 30 is configured to be able to correct a color difference signal simultaneously with the correction of the brightness signal. Accordingly, the color difference signals U and V (color difference components of the input image signal), which correspond to the brightness signal, are stored in the line memory 70 in synchronization with the timing at which the brightness signal Y is stored in the line memory 32.

The color difference gain calculating circuit 80 calculates the amount of correction of the color difference signals U and V on the basis of the brightness signals Y and Y1 before and after correction using the brightness signal correcting circuit 60, for example, such that the value of xy chromaticity of the XYZ colorimetric system (CIE 1931 standard colorimetric system) does not change. Here, the color difference gain calculating circuit 80 calculates the gain coefficient corresponding to the amount of correction of the color difference signal.

The color difference signal correcting circuit 90 corrects the color difference signals U and V stored in the line memory 70 using the amount of correction calculated by the color difference gain calculating circuit 80 and outputs them as corrected color difference signals U1 and V1. As a result, the color difference signal correcting circuit 90 can correct the color difference signals U and V such that the value of xy chromaticity does not change before and after correction using the brightness signal correcting circuit 60.

Thus, the image processing unit 30 can correct the brightness signal only for brightness signals with a predetermined brightness level in a predetermined spatial frequency band. In addition, the image processing unit 30 can correct a color difference signal according to the amount of correction of the brightness signal simultaneously with the correction of the brightness signal.

Next, each block which forms the image processing unit 30 will be described.

Figure 5:
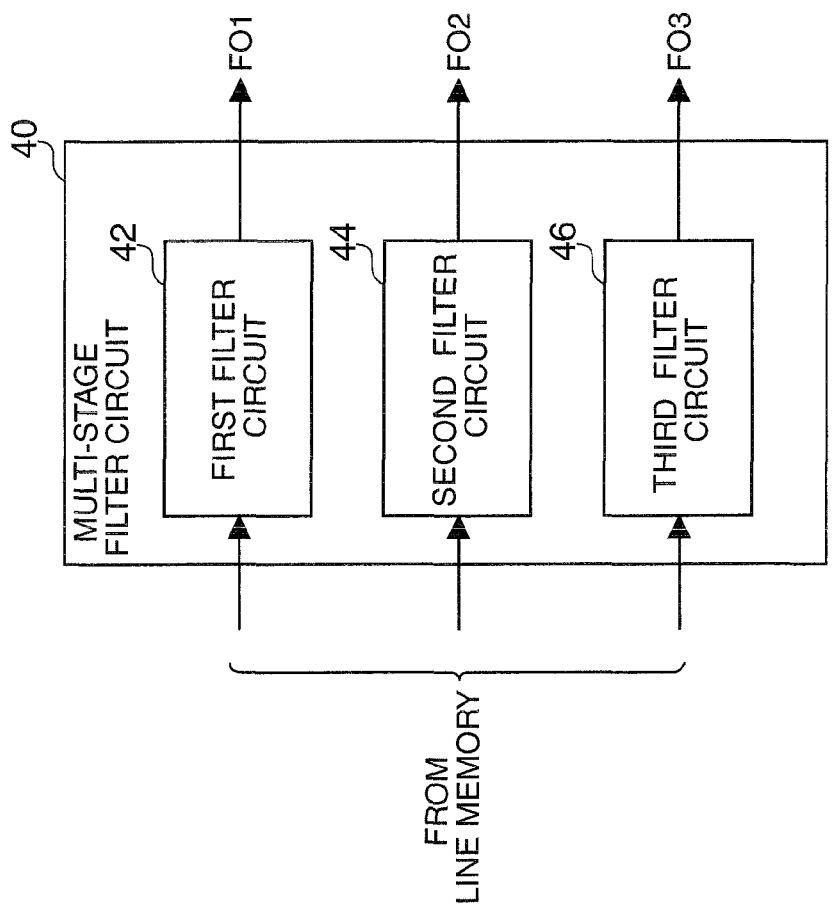
FIG. 5 is a block diagram illustrating an example of the configuration of a multi-stage filter circuit in FIG. 4.

FIG. 5 is a block diagram illustrating an example of the configuration of the multi-stage filter circuit 40 in FIG. 4. In FIG. 5, the same sections as in FIG. 4 are denoted by the same reference numerals, and the explanation will be appropriately omitted.

The multi-stage filter circuit 40 includes first to third filter circuits 42, 44, and 46 with different filter sizes. In FIG. 5, an example in which the multi-stage filter circuit 40 performs filtering with three kinds of filter circuits will be described. However, the invention is not limited to the number of filter circuits.

The multi-stage filter circuit 40 has a plurality of filter circuits, and the frequency bands of signals extracted by the plurality of filter circuits are different. Each of the filter circuits outputs the result of a convolution operation of pixel values of the pixels which are arrayed in the horizontal and vertical directions of an image and the filter coefficient matrix.

The first filter circuit 42 can output the result after filtering which is performed according to the following expression.

$$FO1 = \sum_{(i,j) \in F} u(i, j)Y(x+i, y+j) \left( -\frac{s-1}{2} \leq i, j \leq \frac{s-1}{2} \right) \quad (1)$$

In the above expression, it is assumed that the output of the first filter circuit 42 is FO1, the brightness signal of the coordinates (x, y) is Y(x, y), the filter coefficient is a, (i, j) are the relative coordinates with respect to the object pixel and are within the range of the above expression, and the filter size is s. Brightness signals of the line number (vertical scan line number), which correspond to the filter size, are input to each filter circuit.

Although the output of the first filter circuit 42 is shown in the above expression, the second and third filter circuits 44 and 46 can also output the same filtering result as in the above expression (outputs FO2 and FO3).

In FIG. 5, the filter size of the first filter circuit 42 is set to '3', the filter size of the second filter circuit 44 is set to '5', and the filter size of the third filter circuit 46 is set to '7', However, the invention is not limited to the filter size.

Figure 6:
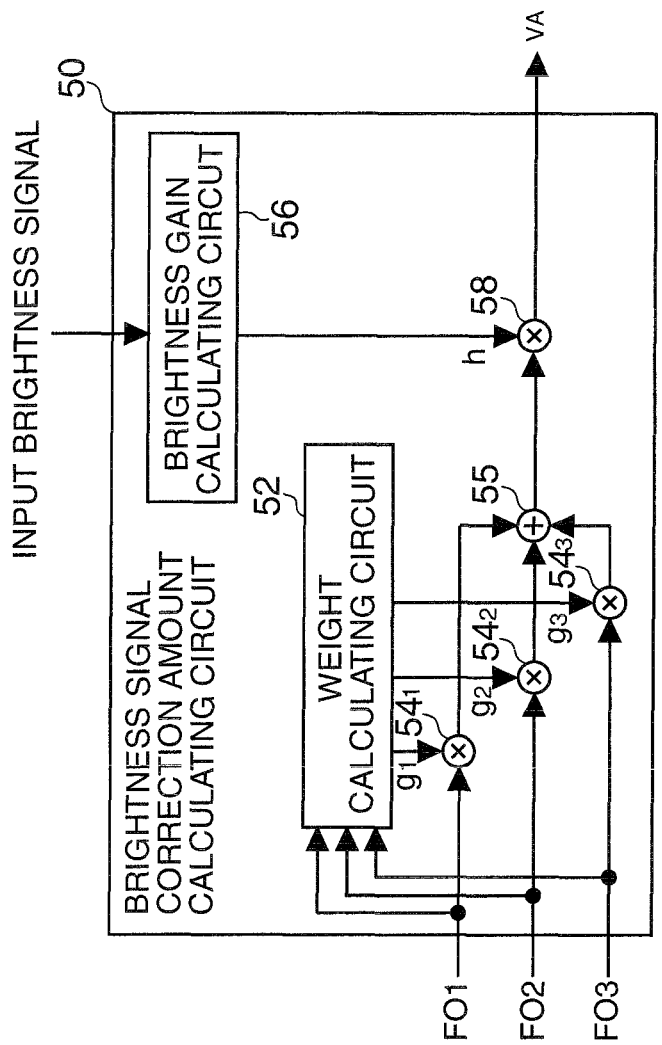
FIG. 6 is a block diagram illustrating an example of the configuration of a brightness signal correction amount calculating circuit in FIG. 4.

FIG. 6 is a block diagram illustrating an example of the configuration of the brightness signal correction amount calculating circuit 50 in FIG. 4. In FIG. 6, the same sections as in FIG. 4 are denoted by the same reference numerals, and the explanation will be appropriately omitted.

FIG. 7 is a view for explaining an operation of the weight calculating circuit 52 in FIG. 6.

FIG. 8 is a view for explaining an operation of a brightness gain calculating circuit 56 in FIG. 6.

The brightness signal correction amount calculating circuit 50 includes the weight calculating circuit 52, multipliers $54_1$ to $54_3$, an adder 55, the brightness gain calculating circuit 56, and a multiplier 58.

Outputs of the first to third filter circuits 42 to 46, which form the multi-stage filter circuit 40, are input to the weight calculating circuit 52. Moreover, the weight calculating circuit 52 calculates weight coefficients $g_1$ to $g_3$ according to the combination of the outputs of the first to third filter circuits 42 to 46, as shown in FIG. 7.

Such a weight calculating circuit 52 is realized by a look up table (hereinafter, referred to as a LUT) which has the outputs of the first to third filter circuits 42 to 46 as the inputs and has the weight coefficients $g_1$ to $g_3$ as the outputs. Accordingly, weight coefficients $(g_1a, g_2a, g_3a)$, $(g_1b, g_2b, g_3b)$, $(g_1c, g_2c, g_3c)$, ... which correspond to the combination of the outputs of the first to third filter circuits 42 to 46, are stored beforehand in the weight calculating circuit 52, such that the weight coefficients, which correspond to the combination, are output when the outputs FO1 to FO3 of the first to third filter circuits 42 to 46 are input.

The weight coefficient $g_1$ is input to the multiplier $54_1$ to which the output FO1 of the first filter circuit 42 is input. The multiplier $54_1$ outputs a result, which is obtained by multiplying the output FO1 of the first filter circuit 42 by the weight coefficient $g_1$, to the adder 55.

The weight coefficient $g_2$ is input to the multiplier $54_2$ to which the output FO2 of the second filter circuit 44 is input. The multiplier $54_2$ outputs a result, which is obtained by multiplying the output FO2 of the second filter circuit 44 by the weight coefficient $g_2$, to the adder 55.

The weight coefficient $g_3$ is input to the multiplier $54_3$ to which the output FO3 of the third filter circuit 46 is input. The multiplier $54_3$ outputs a result, which is obtained by multiplying the output FO3 of the third filter circuit 46 by the weight coefficient $g_3$, to the adder 55.

The adder 55 adds the multiplication results of the multipliers $54_1$ to $54_3$ and outputs the addition result to the multiplier 58. The brightness gain coefficient h calculated by the brightness gain calculating circuit 56 is input to the multiplier 58.

A brightness signal which forms the input image signal is input to the brightness gain calculating circuit 56. In addition, the brightness gain calculating circuit 56 calculates the brightness gain coefficient h (brightness gain) corresponding to the level (level of the brightness component of the image signal) of the brightness signal, as shown in FIG. 8.

Such a brightness gain calculating circuit 56 is realized by the LUT which has a brightness signal (brightness component of an image signal) as the inputs and has the weight coefficient h as the outputs. For this reason, brightness gain coefficients ha, hb, hc, ... which correspond to the brightness signals (input brightness signals) which form the input image signal, are stored beforehand in the brightness gain calculating circuit 56, such that the brightness gain coefficient corresponding to the brightness signal is output when the brightness signal which form the input image signal is input. Since the brightness gain coefficient corresponding to the desired brightness signal can be designated in the brightness gain calculating circuit 56, the amount of correction can be generated only for the designated gray level.

The multiplier 58 outputs a correction signal VA corresponding to the amount of correction of the brightness signal by multiplying the addition result of the adder 55 by the brightness gain coefficient h from the brightness gain calculating circuit 56. The correction signal VA is input to the brightness signal correcting circuit 60.

Thus, the brightness signal correction amount calculating circuit 50 can calculate the amount of correction of the brightness signal on the basis of the signal in the predetermined spatial frequency band extracted by the multi-stage filter circuit 40 (in a broad sense, a signal extracting circuit) and the brightness gain coefficient calculated by the brightness gain calculating circuit 56. In addition, the brightness signal correcting circuit 60 outputs the corrected brightness signal Y1 by adding correction signal VA from the brightness signal correction amount calculating circuit 50 to the brightness signal which forms the input image signal, for example.

In addition, the correction processing of a color difference signal which corresponds to the amount of correction of the brightness signal and which is performed simultaneously with the correction of the brightness signal can be realized by the following configuration.

Figure 9:
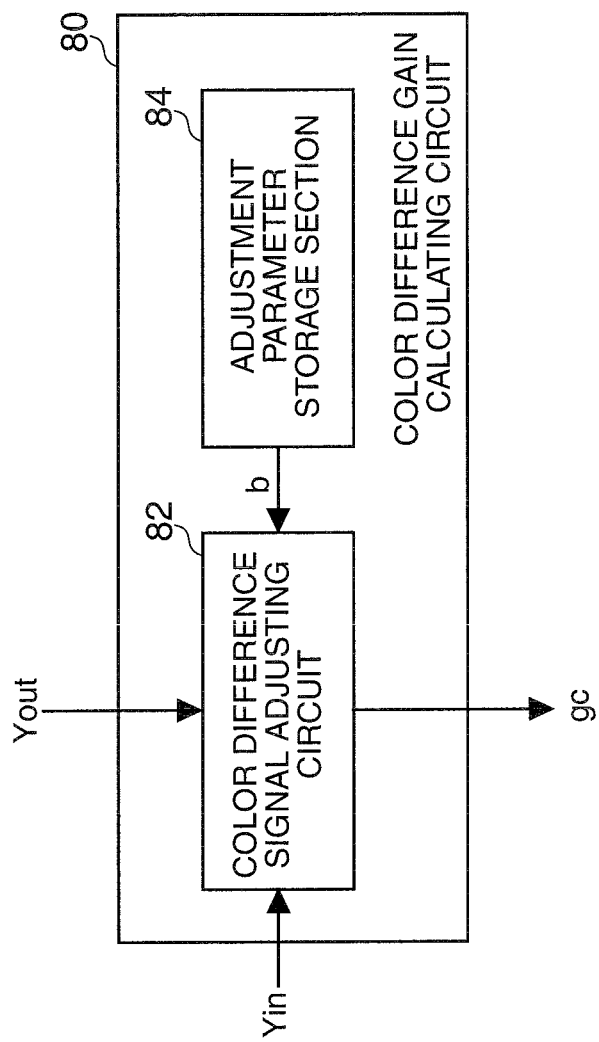
FIG. 9 is a block diagram illustrating an example of the configuration of a color difference gain calculating circuit in FIG. 4.

FIG. 9 is a block diagram illustrating an example of the configuration of the color difference gain calculating circuit 80 in FIG. 4. In FIG. 9, the same sections as in FIG. 4 are denoted by the same reference numerals, and the explanation will be appropriately omitted.

The color difference gain calculating circuit 80 includes a color difference signal adjusting circuit 82 and an adjustment parameter storage section 84. The brightness signal (brightness component of the input image signal) Yin which forms the input image signal, the brightness signal Yout obtained by correcting the brightness signal Yin as described above, and an adjustment parameter b stored in the adjustment parameter storage section 84 are input to the color difference signal adjusting circuit 82. Moreover, the color difference signal adjusting circuit 82 calculates a color difference gain coefficient (color difference gain) gc using the brightness signals Yin and Yout and the adjustment parameter b.

More specifically, the color difference gain calculating circuit 80 calculates the color difference gain coefficient gc according to the following expression.

$$gc = 1 - b \times (1 - Yout/Yin) \qquad (2)$$

In the above expression, the adjustment parameter b is a parameter for adjusting the chromaticity. When the adjustment parameter b is '0', the color difference signal (color difference component) which forms the input image signal is output without being corrected. On the other hand, when the adjustment parameter b is '1', the color difference signal is also corrected according to the amount of correction of the brightness signal so that the chromaticity is not changed before and after correction of the brightness signal of the input image signal. Although the adjustment parameter b can be set to a value which is larger than '0' and smaller than '1', the adjustment parameter b is preferably '1' in the first embodiment.

Figure 10:
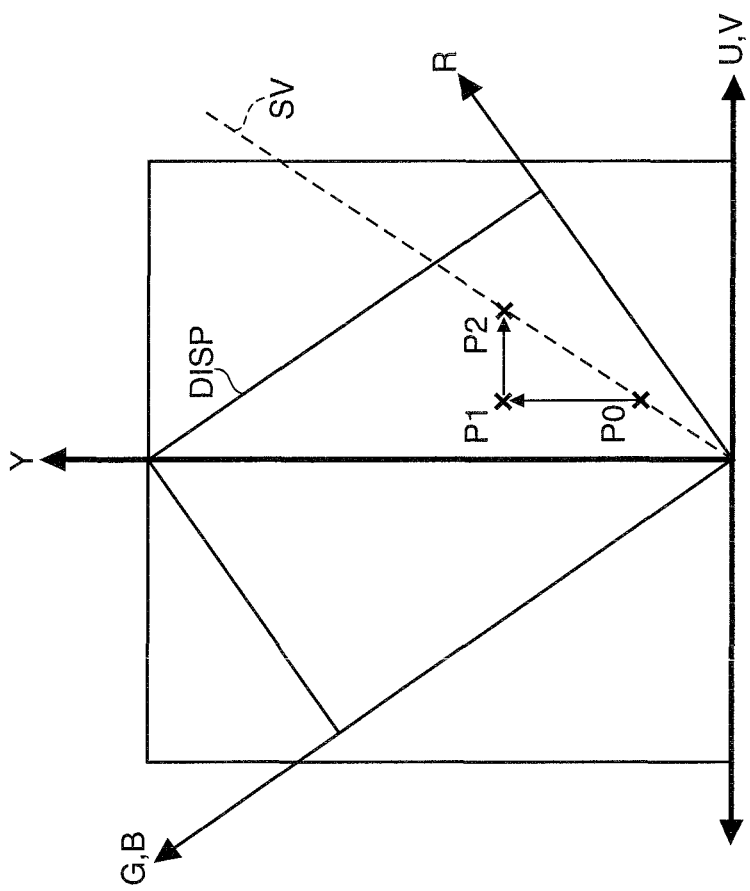
FIG. 10 is a view for explaining an example of the operation of the color difference gain calculating circuit in FIG. 9.

FIG. 10 is a view for explaining an example of the operation of the color difference gain calculating circuit 80 in FIG. 9. In FIG. 10, the adjustment parameter b is assumed to be '1'.

When the color space, in which the brightness signal is shown on the vertical axis and the color difference signal is shown on the horizontal axis, is expressed, R, and G, and B components of the RGB are defined in the directions shown in FIG. 10. Here, a region DISP indicates the color gamut which can be reproduced in the display device. In this case, when the color of the input image signal is at the coordinate P0, the value of the xy chromaticity diagram is equal on the isopleth SV passing through the coordinate P0. However, when the brightness signal which forms the input image signal is corrected as described above, it moves to the coordinate P1. For this reason, the tendency of the color after the correcting of the brightness signal changes since the coordinate P1 does not exist on the isopleth SV.

Therefore, the color difference gain calculating circuit 80 calculates the color difference gain coefficient gc in order to correct the color difference signal according to the amount of correction of the brightness signal so that the color of the input signal at the coordinate P0 is converted to the coordinate P2 on the isopleth SV. This makes it possible to maintain the tendency of the colors on the whole screen without changing the brightness level after correction even if the brightness signal is corrected. As a result, visually natural correction can be realized without changing the chromaticity of each pixel before and after correction.

The color difference gain coefficient gc calculated in this way is input to the color difference signal correcting circuit 90. The color difference signal correcting circuit 90 multiplies the color difference gain coefficient gc by the color difference signal V from the line memory 70 while multiplying the color difference gain coefficient gc by the color difference signal U from the line memory 70. The color difference signals U and V corrected in this way are input to the projection unit 100.

Thus, the image processing unit 30 can correct not only the brightness signal but also the color difference signal simultaneously with the brightness signal. As a result, since it is possible to avoid the situation where the chromaticity of each pixel changes according to the amount of correction of the brightness signal and the tendency of the overall colors on the screen accordingly changes, the tendency of the colors on the whole screen can be maintained when expressing the detail of the image.

The processing of the image processing unit 30 in the first embodiment may also be realized by software processing. In this case, the image processing unit 30 includes a central processing unit (hereinafter, simply referred to as a CPU) and a read only memory (hereinafter, simply referred to as a ROM) or a random access memory (hereinafter, simply referred to as a RAN). The image processing unit 30 performs the correction processing of the brightness component and the color difference component by controlling the hardware, such as the multiplier and the adder, by making the CPU, which has read a program stored in the RON or RAM, execute the processing corresponding to the program.

Figure 11:
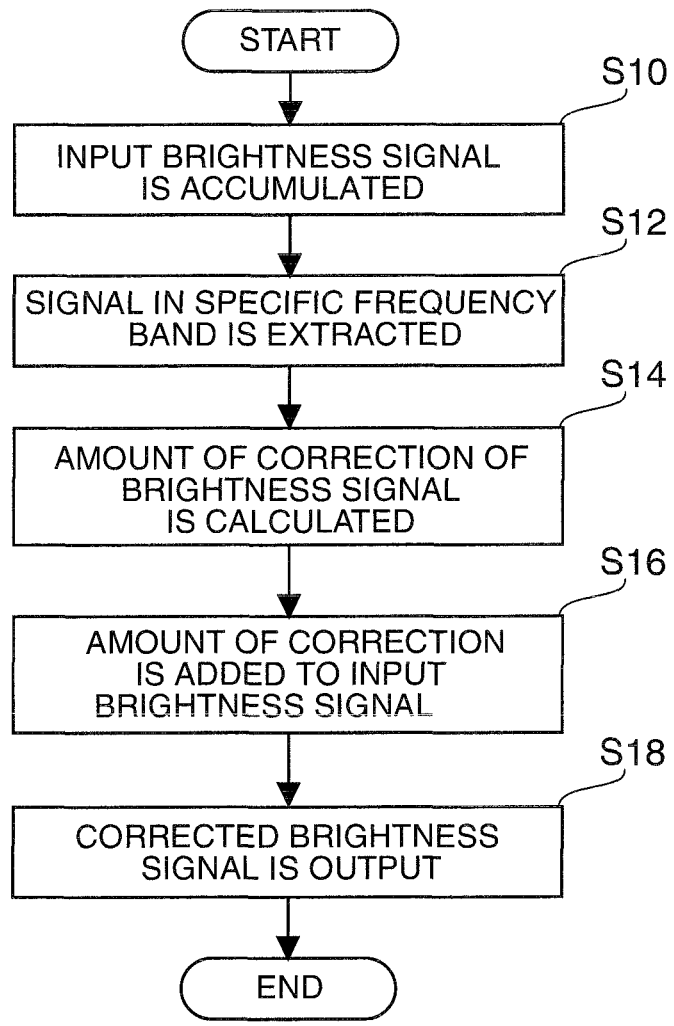
FIG. 11 is a flow chart illustrating an example of the correction processing of a brightness signal of the image processing unit in the first embodiment.

FIG. 11 is a flow chart illustrating an example of correction processing of a brightness signal of the image processing unit 30 in the first embodiment. In the case of realizing the processing in FIG. 11 with software, a program for realizing the processing shown in FIG. 11 is stored in the ROM or RAM provided in the image processing unit 30.

First, as an input brightness signal accumulating step (step S10), the image processing unit 30 accumulates a brightness signal (input brightness signal) which forms an input image signal. In this case, the brightness signal is stored in the line memory 32 or the RAM used for realizing the function of the line memory 32.

Then, as a signal extracting step (step S12), the image processing unit 30 extracts a specific spatial frequency band of the brightness signal. For example, the multi-stage filter circuit 40 extracts the brightness signal in the predetermined spatial frequency band. Or when realizing the above by software processing, the CPU controls the multiplier or the adder used for realizing the function of the multi-stage filter circuit 40 to thereby extract the brightness signal in the spatial frequency band.

Then, as a brightness component correction amount calculating step (step S14), the image processing unit 30 calculates the amount of correction of the brightness signal. That is, the brightness signal correction amount calculating circuit 50 outputs the correction signal VA obtained by performing weighting according to the signal extracted by the multi-stage filter circuit 40 and then performing multiplication using the coefficient corresponding to the brightness level of the brightness signal which forms the input image signal. Or when realizing the above by software processing, the CPU generates the correction signal VA obtained by performing weighting according to the signal extracted by the signal extraction processing and then performing multiplication using the coefficient corresponding to the brightness level of the brightness signal which forms the input image signal. That is, in step S14, as a brightness gain calculating step, the brightness gain corresponding to the level of the brightness component of the image signal is calculated. In addition, the amount of correction of the brightness component is calculated on the basis of the signal in the spatial frequency band extracted in step S12 and the brightness gain calculated in step S14.

Then, as a brightness component correcting step (step S16), the image processing unit 30 corrects the brightness signal, which forms the input image signal, using the amount of correction calculated in step S14 and outputs the corrected brightness signal (step S18), completing the series of the process (End). That is, in step S16, the brightness signal correcting circuit 60 generates the corrected brightness signal by adding the correction signal VA to the brightness signal which forms the input image signal. Or when realizing the above by software processing, the CPU generates the corrected brightness signal by adding the correction signal VA to the brightness signal which forms the input image signal.

Figure 12:
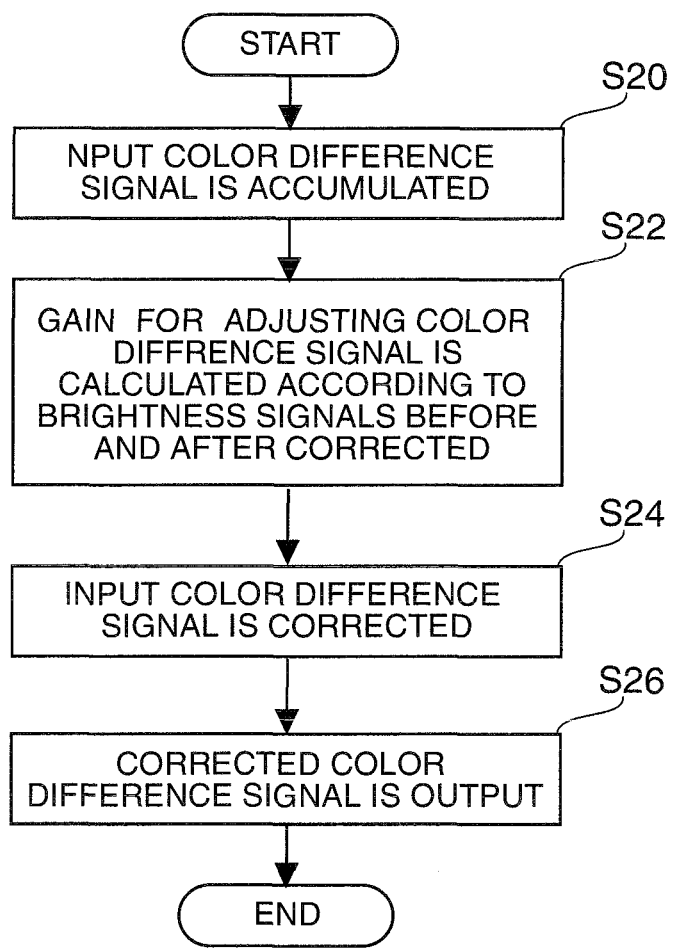
FIG. 12 is a flow chart illustrating an example of the correction processing of a color difference signal of the image processing unit in the first embodiment.

FIG. 12 is a flow chart illustrating an example of correction processing of a color difference signal of the image processing unit 30 in the first embodiment. In the case of realizing the processing in FIG. 12 with software, a program for realizing the processing shown in FIG. 12 is stored in the ROM or RAM provided in the image processing unit 30.

First, as an input color difference signal accumulating step (step S20), the image processing unit 30 accumulates a color difference signal (input color difference signal) which forms an input image signal. In this case, the color difference signal is stored in the line memory 32 or the RAM used for realizing the function of the line memory 32.

Then, as a color difference component correction amount calculating step (step S22), the image processing unit 30 calculates the color difference gain coefficient for adjusting the color difference signal according to the brightness signals before and after correction in the correction processing of the brightness signal in FIG. 11. For example, the color difference signal adjusting circuit 82 outputs the color difference gain coefficient gc corresponding to the adjustment parameter designated beforehand and the brightness signals before and after the correction. Or when realizing the above by software processing, the CPU outputs the color difference gain coefficient gc according to the above expression (2) using the adjustment parameter b determined beforehand. Thus, in step S22, the amount of correction of the color difference component of the image signal is calculated such that the value of xy chromaticity does not change before and after correction in the brightness component correcting step.

Then, as a color difference component correcting step (step S24), the image processing unit 30 corrects the color difference signal, which forms the input image signal, using the amount of correction of color difference component (color difference gain coefficient) calculated in step S22 and outputs the corrected color difference signal (step S26), completing the series of the process (End). That is, in step S24, the color difference signal correcting circuit 90 generates the corrected color difference signal by multiplying the color difference signal which forms the input image signal by the color difference gain coefficient calculated in step S22. Or when realizing the above by software processing, the CPU generates the corrected color difference signal by multiplying the color difference signal which forms the input image signal by the color difference gain coefficient. Thus, in step S24, the color difference component of the image signal is corrected such that the value of xy chromaticity does not change before and after correction in the brightness component correcting step.

The brightness signal Y1 and the color difference signals U1 and V1 corrected by the image processing unit 30 are output to the projection unit 100. The projection unit 100 can modulate the light from the light source on the basis of the brightness signal Y1 and the color difference signals U1 and V1 and project the modulated light onto the screen SCR.

Figure 13:
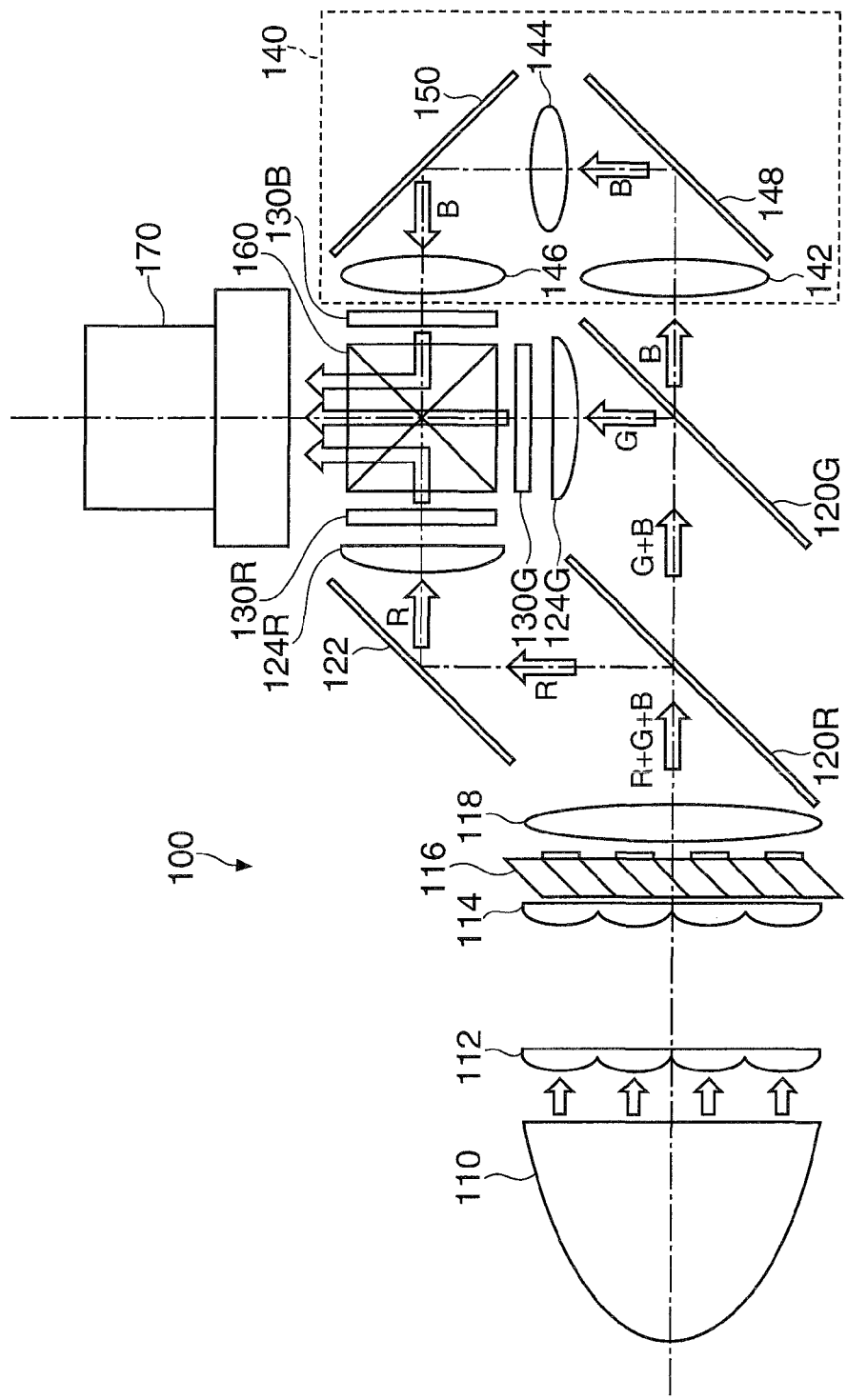
FIG. 13 is a view illustrating an example of the configuration of a projection unit in FIG. 1.

FIG. 13 is a view illustrating an example of the configuration of the projection unit 100 in FIG. 1. In FIG. 13, an explanation is made assuming the projection unit 100 in the first embodiment is formed from a so-called three plate type liquid crystal projector. However, the projection unit of the image display device of the invention is not limited to being formed from the so-called three plate type liquid crystal projector. That is, the following explanation will be made assuming that one pixel is formed by an R-component sub-pixel, a G-component sub-pixel, and a B-component sub-pixel. However, the number of sub-pixels (the number of color components) which form one pixel is not limited thereto.

Moreover, in FIG. 13, it is assumed that the brightness signal Y1 and the color difference signals U1 and V1, which are input from the image processing unit 30, are converted into image signals of the respective color components of RGB and then the light from the light source is modulated for every color component. In this case, a circuit for conversion into the RGB signals may be provided in the image processing unit 30 or may be provided in the projection unit 100.

The projection unit 100 in the first embodiment includes a light source 110, integrator lenses 112 and 114, a polarization conversion device 116, a superposition lens 118, a dichroic mirror 120R for R, a dichroic mirror 120G for G, a reflecting mirror 122, a field lens 124R for R, a field lens 124G for G, a liquid crystal panel 130R (first light modulating device) for R, a liquid crystal panel 130G (second light modulating device) for G, a liquid crystal panel 130B (third light modulating device) for B, a relay optical system 140, a cross dichroic prism 160, and a projection lens 170. Liquid crystal panels used as the liquid crystal panel 130R for R, the liquid crystal panel 130G for G, and the liquid crystal panel 130B for B are transmissive liquid crystal display devices. The relay optical system 140 includes relay lenses 142, 144, and 146 and reflecting mirrors 148 and 150.

The light source 110 is formed from an ultrahigh-pressure mercury lamp, for example, and emits light including at least R-component light, G-component light, and B-component light. The integrator lens 112 has a plurality of small lenses for dividing light from the light source 110 into a plurality of partial light components. The integrator lens 114 has a plurality of small lenses corresponding to the plurality of small lenses of the integrator lens 112. The superposition lens 118 superimposes partial light components emitted from the plurality of small lenses of the integrator lens 112 on the liquid crystal panel.

In addition, the polarization conversion device 116 has a polarizing beam splitter array and a λ/2 plate and converts light from the light source 110 into approximately one kind of polarized light. The polarizing beam splitter array has a structure in which a polarized light separating film, which divides partial light components divided by the integrator lens 112 into p-polarized light and s-polarized light, and a reflecting film, which changes the direction of the light from the polarized light separating film, are alternately arrayed. Polarization directions of two kinds of polarized light components separated by the polarized light separating film are aligned by the λ/2 plate. The light converted into approximately one kind of polarized light by the polarization conversion device 116 is irradiated to the superposition lens 118.

The light from the superposition lens 118 is incident on the dichroic mirror 120R for R. The dichroic mirror 120R for R has a function for reflecting R-component light and allowing G-component light and B-component light to pass through. Light transmitted through the dichroic mirror 120R for R is irradiated to the dichroic mirror 120G for G, and light reflected by the dichroic mirror 120R for R is reflected by the reflecting mirror 122 and is guided to the field lens 124R for R.

The dichroic mirror 120G for G has a function for reflecting G-component light and allowing B-component light to pass through. Light transmitted through the dichroic mirror 120G for G is incident on the relay optical system 1401 and light reflected by the dichroic mirror 120G for G is guided to the field lens 124G for G.

In the relay optical system 140, in order to make the difference between the optical path length of the B-component light transmitted through the dichroic mirror 120G for G and the optical path length of the other R-component and C-component light as small as possible, the relay lenses 142, 144, and 146 are used to correct the differences in the optical path lengths. Light transmitted through the relay lens 142 is guided to the relay lens 144 by the reflecting mirror 148. Light transmitted through the relay lens 144 is guided to the relay lens 146 by the reflecting mirror 150. Light transmitted through the relay lens 146 is irradiated to the liquid crystal panel 130B for B.

Light irradiated to the field lens 124R for R is converted into parallel beams to be incident on the liquid crystal panel 130R for R. The liquid crystal panel 130R for R functions as a light modulating device (light modulating section), and the transmittance (passing rate, modulation rate) is set to change on the basis of an image signal for R. Therefore, light (light of a first color component) incident on the liquid crystal panel 130R for R is modulated on the basis of the image signal for R, and the modulated light is incident on the cross dichroic prism 160.

Light irradiated to the field lens 124G for G is converted into parallel beams to be incident on the liquid crystal panel 130G for G. The liquid crystal panel 130G for G functions as a light modulating device (light modulating section), and the transmittance (passing rate, modulation rate) is set to change on the basis of an image signal for G. Therefore, light (light of a second color component) incident on the liquid crystal panel 130G for G is modulated on the basis of the image signal for G, and the modulated light is incident on the cross dichroic prism 160.

The liquid crystal panel 130B for B to which light converted into parallel beams is irradiated by the relay lenses 142, 144, and 146 functions as a light modulating device (light modulating section), and the transmittance (passing rate, modulation rate) is set to change on the basis of an image signal for B. Therefore, light (light of a third color component) incident on the liquid crystal panel 130B for B is modulated on the basis of the image signal for B, and the modulated light is incident on the cross dichroic prism 160.

The liquid crystal panel 130R for R, the liquid crystal panel 130G for G, and the liquid crystal panel 130B for B have the same configuration. Each liquid crystal panel is formed by sealing liquid crystal, which is an electro-optical material, between a pair of transparent glass substrates. In each liquid crystal panel, the passing rate of each color light is changed corresponding to the image signal of each sub-pixel, for example, using a polysilicon thin film transistor as a switching element.

In the first embodiment, the liquid crystal panel as a light modulating device is provided for every color component which forms one pixel, and the transmittance of each liquid crystal panel is controlled by the image signal corresponding to the sub-pixel. That is, the image signal for an R-component sub-pixel is used to control the transmittance (passing rater modulation rate) of the liquid crystal panel 130R for R, the image signal for a G-component sub-pixel is used to control the transmittance (passing rate, modulation rate) of the liquid crystal panel 130G for G, and the image signal for a B-component sub-pixel is used to control the transmittance (passing rate, modulation rate) of the liquid crystal panel 130B for B. In the first embodiment, the transmittance of each liquid crystal panel provided for every color component is controlled by performing contrast processing on the image signal for each color component and converting the image signal after contrast processing into a signal corresponding to the pixel value of each RGB color component.

The cross dichroic prism 160 has a function of outputting mixed light, in which incident light from the liquid crystal panel 130R for R, the liquid crystal panel 130G for G, and the liquid crystal panel 130B for B is mixed, as emitted light. The projection lens 170 is a lens which forms an output image on the screen SCR in an enlarged manner.

By controlling the projection unit 100 as an image display step after the performing of the gray level correction processing in the first embodiment so that the image is displayed on the basis of the image signal corrected in the gray level correction processing, an image display method can be provided which is capable of improving the expression of the detail of the image without affecting the other brightness regions.

As described above, according to the first embodiment, not only is the brightness signal corrected, but also the color difference signal is corrected simultaneously with the brightness signal. In this case, for the brightness signal, only a predetermined brightness level range is corrected in a predetermined spatial frequency band. Accordingly, the spatial frequency changes in the first direction of the image and the level of the brightness component of the image signal changes in the second direction crossing the first direction. As a result, the projector 20 displays the following image when a test image is input, in which an AC component of the brightness component is entirely uniform.

Figure 14:
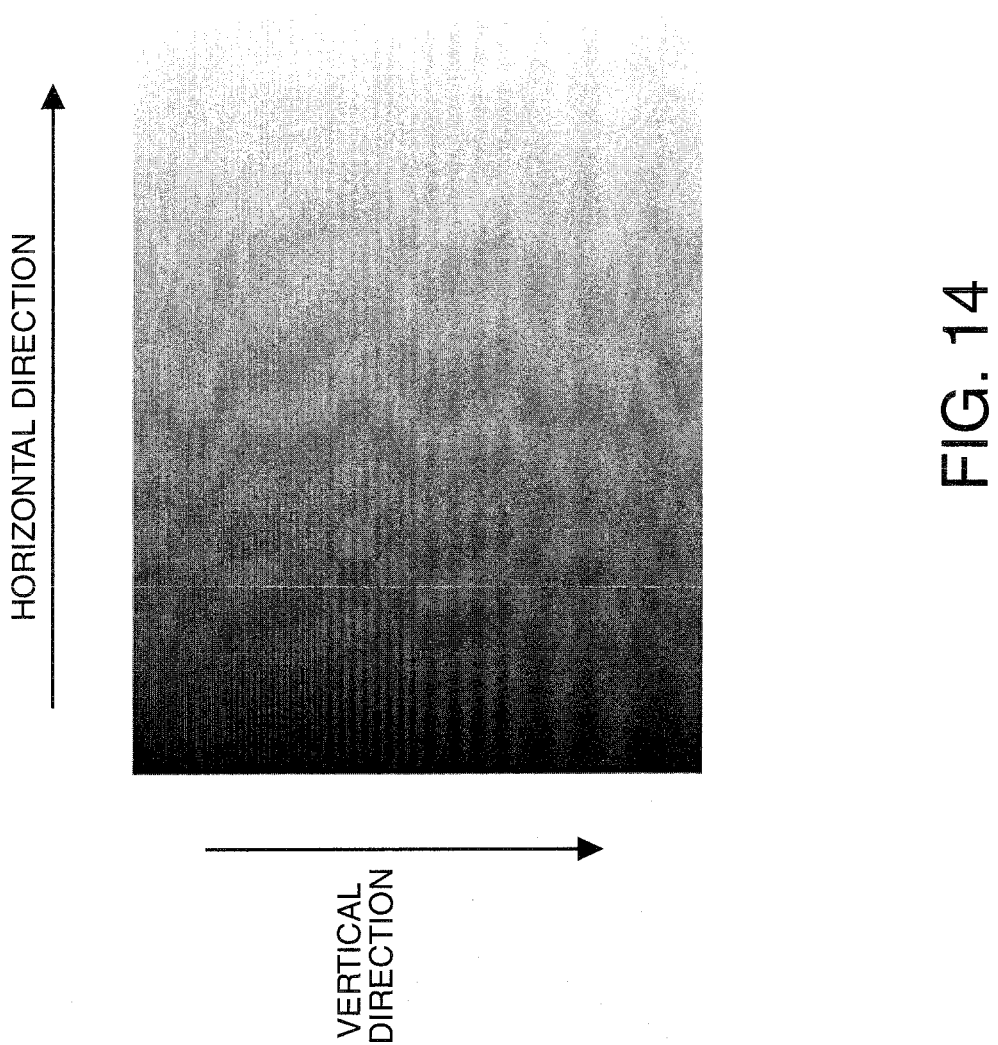
FIG. 14 is a schematic view illustrating a test image in the first embodiment.

FIG. 14 is a schematic view illustrating the test image in the first embodiment.

This test image is an image in which the spatial frequency gradually changes in the vertical direction (first direction) of the image (for example, changes from a high frequency to a low frequency in the first direction), the level of the brightness component of the image signal gradually changes in the horizontal direction (second direction crossing the first direction) of the image (for example, changes from the low brightness to the high brightness in the second direction), and an AC component of the brightness component is entirely uniform. When such a test image is input to the projector 20, the image processing unit 30 corrects the brightness signal only in a predetermined brightness level range of a predetermined spatial frequency band. Accordingly, the projector 20, to which the test image shown in FIG. 14 has been input, displays an image in which the AC component of the brightness is not uniform over the predetermined brightness level range of the predetermined spatial frequency band.

That is, when an image signal of the test image is corrected by the gray level correction processing in the first embodiment as an image processing step and then an image is displayed on the basis of the image signal after the gray level correction processing as an image display step, an image is displayed in which the AC component of the brightness is not uniform over the predetermined brightness level range of the predetermined spatial frequency band.

Therefore, it becomes possible to provide the projector 20 capable of expressing the detail of dark or bright portions of an image by setting the extracted spatial frequency band as the desired band and setting the brightness level range as the desired range.

In addition, although the first direction is the vertical direction of the image and the second direction is the horizontal direction of the image in FIG. 14, the same is true for the case when the first direction is the horizontal direction of the image and the second direction is the vertical direction of the image.

Second Embodiment

In the image processing unit 30 of the first embodiment, the brightness signal correction amount calculating circuit 50 is configured to include the weight calculating circuit 52 and the brightness gain calculating circuit 56 as shown in FIG. 6 and to generate the correction signal VA by the multiplier which performs multiplication of the weight coefficient or the brightness gain coefficient. However, the invention is not limited to the configuration.

Figure 15:
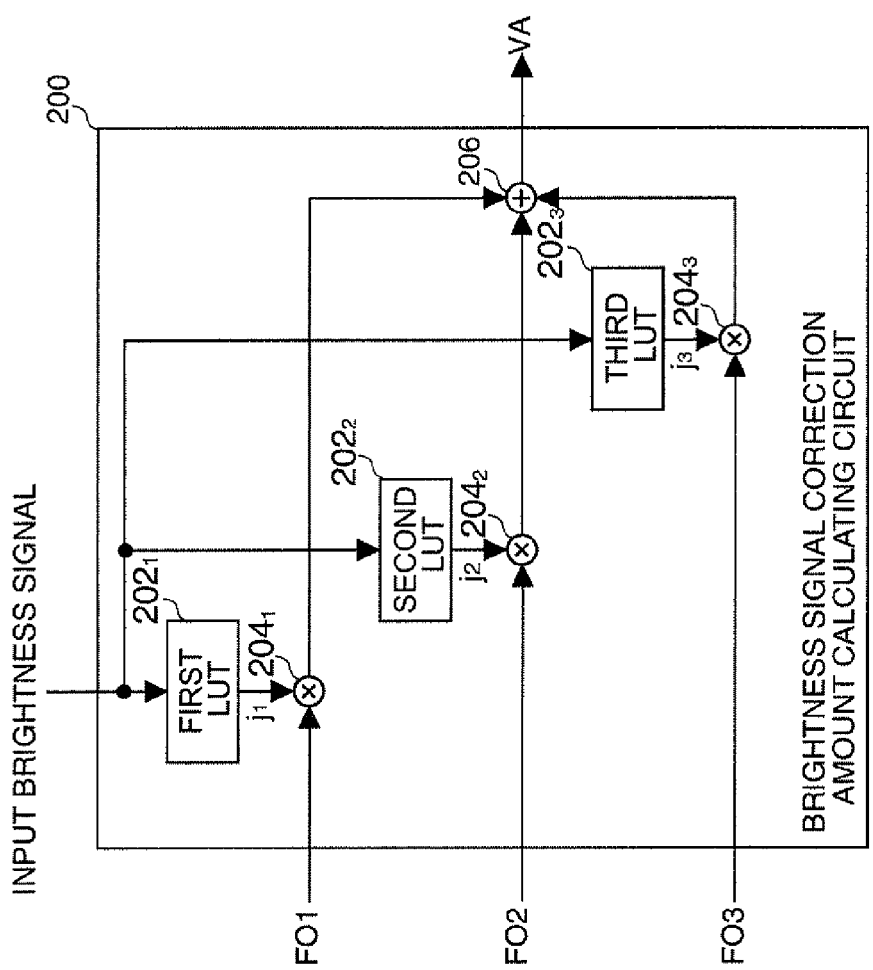
FIG. 15 is a block diagram illustrating an example of the configuration of a brightness signal correction amount calculating circuit in a second embodiment of the invention.

FIG. 15 is a block diagram illustrating an example of the configuration of a brightness signal correction amount calculating circuit 200 in a second embodiment of the invention. For example, instead of the brightness signal correction amount calculating circuit 50 in the first embodiment, the brightness signal correction amount calculating circuit 200 shown in FIG. 15 is built in the image processing unit 30 in FIG. 4.

The brightness signal correction amount calculating circuit 200 includes first to third LUTs $202_1$ to $202_3$, multipliers $204_1$ to $204_3$, and an adder 206. The brightness signal correction amount calculating circuit 200 multiplies each output of the multi-stage filter circuit 40 by the brightness gain coefficient from each LUT of the first to third LUTs $202_1$ to $202_3$ and then adds the multiplication results and outputs it as a correction signal VA.

FIGS. 16A to 16C are views for explaining operations of the first to third LUTs $202_1$ to $202_3$ in FIG. 15.

A brightness signal which forms the input image signal is input to the first LUT $202_1$, and a brightness gain coefficient $j_1$ corresponding to the brightness signal is output from the first LUT $202_1$. For this reason, brightness gain coefficients $j_1a, j_1b, j_1c, \ldots$ corresponding to the brightness signals are stored beforehand in the first LUT $202_1$, such that the brightness gain coefficient corresponding to the brightness signal is output as the brightness gain coefficient $j_1$ when the brightness signal is input.

A brightness signal which forms an input image signal is input to the second LUT $202_2$, and a brightness gain coefficient $j_2$ corresponding to the brightness signal is output from the second LUT $202_2$. For this reason, brightness gain coefficients $j_2a, j_2b, j_2c, \ldots$ corresponding to the brightness signals are stored beforehand in the second LUT $202_2$, such that the brightness gain coefficient corresponding to the brightness signal is output as the brightness gain coefficient $j_2$ when the brightness signal is input.

A brightness signal which forms an input image signal is input to the third LUT $202_3$, and a brightness gain coefficient $j_3$ corresponding to the brightness signal is output from the third LUT $202_3$. For this reason, brightness gain coefficients $j_3a, j_3b, j_3c, \ldots$ corresponding to the brightness signals are stored beforehand in the third LUT $202_3$, such that the brightness gain coefficient corresponding to the brightness signal is output as the brightness gain coefficient $j_3$ when the brightness signal is input.

In FIG. 15, the multiplier $204_1$ performs multiplication of an output FO1 of the first filter circuit 42, which forms the multi-stage filter circuit 40, and the brightness gain coefficient $j_1$ from the first LUT $202_1$ and outputs the multiplication result to the adder 206. The multiplier $204_2$ performs multiplication of an output FO2 of the second filter circuit 44, which forms the multi-stage filter circuit 40, and the brightness gain coefficient $j_2$ from the second LUT $202_2$ and outputs the multiplication result to the adder 206. The multiplier 2043 performs multiplication of an output FO3 of the third filter circuit 46, which forms the multi-stage filter circuit 40, and the brightness gain coefficient $j_3$ from the third LUT $202_3$ and outputs the multiplication result to the adder 206.

The adder 206 adds the multiplication results of the multipliers $204_1$ to $204_3$ and outputs the addition result as the correction signal VA.

As described above, the image processing unit in the second embodiment includes the multi-stage filter circuit 40 which extracts a signal in a predetermined spatial frequency band from the brightness component of an image signal. The brightness signal correction amount calculating circuit 200 includes: a plurality of tables which is provided for every output of the multi-stage filter circuit 40 and outputs the gain corresponding to the level of a brightness component before correction; a plurality of multipliers which is provided for every output of the multi-stage filter circuit 40 and performs multiplication of the output of the multi-stage filter circuit 40 and the output of each of the plurality of tables; and an adder which adds the multiplication results of the plurality of multipliers. The brightness signal correction amount calculating circuit 200 can calculate the output of the adder as the amount of correction of the brightness component.

As described above, according to the second embodiment, not only can the brightness signal be corrected, but also the color difference signal can be corrected simultaneously with the brightness signal, similar to the first embodiment. As a result, since it is possible to avoid the situation where the chromaticity of each pixel changes according to the amount of correction of the brightness signal and the tendency of the overall colors on the screen accordingly changes, the tendency of the colors on the whole screen can be maintained when expressing the detail of the image. Moreover, similar to the first embodiment, when the test image shown in FIG. 14 has been input, an image is displayed in which the AC component of the brightness is not uniform over the predetermined brightness level range of the predetermined spatial frequency band.

In addition, according to the second embodiment, the number of multipliers provided in the brightness signal correction amount calculating circuit can be reduced compared with that in the first embodiment. As a result, it becomes possible to reduce power consumption and cost.

Third Embodiment

The brightness signal correction amount calculating circuit 200 in the second embodiment is configured to include the first to third LUTs $202_1$ to $202_3$, the multipliers $204_1$ to $204_3$, and the adder 206 and to add the multiplication results of the multipliers using the brightness gain coefficients from the first to third LUTs $202_1$ to $202_3$, as shown in FIG. 15. However, the invention is not limited to the configuration.

Figure 17:
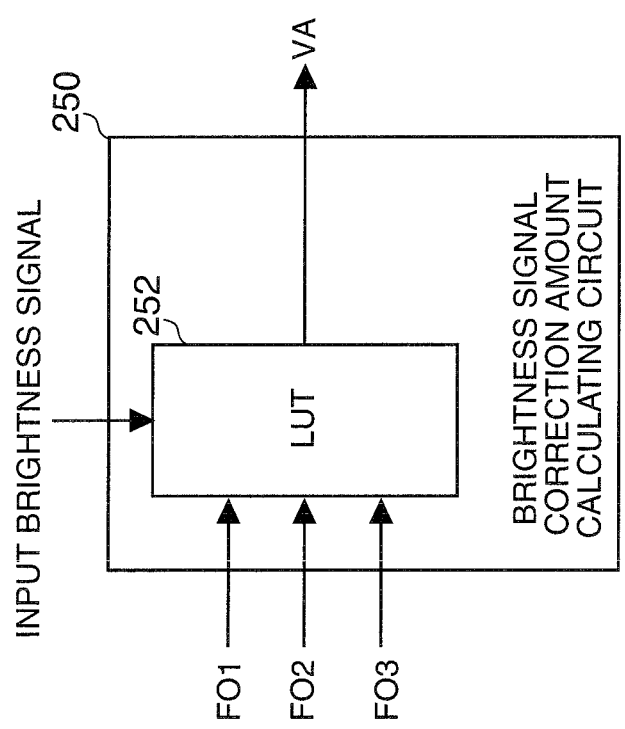
FIG. 17 is a block diagram illustrating an example of the configuration of a brightness signal correction amount calculating circuit in a third embodiment of the invention.
Figure 19:
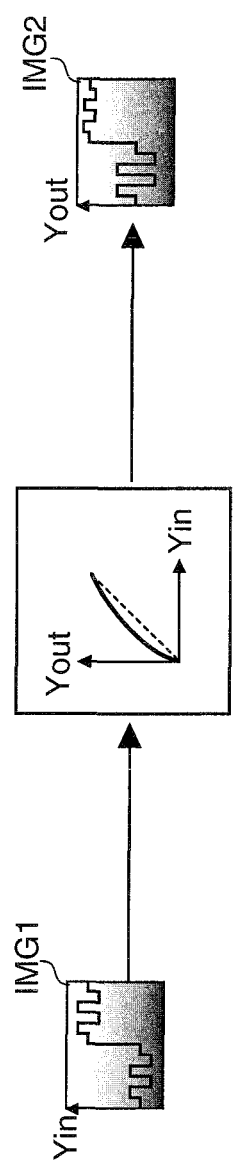
FIG. 19 is a view for explaining the known gray level correction processing.

FIG. 17 is a block diagram illustrating an example of the configuration of a brightness signal correction amount calculating circuit 250 in a third embodiment of the invention. For example, instead of the brightness signal correction amount calculating circuit 50 in the first embodiment, the brightness signal correction amount calculating circuit 250 shown in FIG. 17 is built in the image processing unit 30 in FIG. 4.

The brightness signal correction amount calculating circuit 250 includes an LUT 252. The brightness signal correction amount calculating circuit 250 outputs the output from the LUT 252 as a correction signal VA.

FIG. 18 is a view for explaining an operation of the LUT 252 in FIG. 17.

A brightness signal, which forms an input image signal, and outputs FO1 to FO3 of the first to third filter circuits 42 to 44, which form the multi-stage filter circuit 40, are input to the LUT 252, and the amount of correction corresponding to the combination of the brightness signal and the outputs of the filter circuits is output from the LUT 252. This amount of correction is output as the correction signal VA. For this reason, the amounts of correction VAa, VAb, . . . , VAc, VAd, VAe, . . . corresponding to the combination of the brightness signal and the outputs FO1 to FO3 of the filter circuits are stored beforehand in the LUT 252, such that the amount of correction corresponding to the combination is output when the brightness signal and the output of each filter circuit are input.

As described above, the image processing unit in the third embodiment includes the multi-stage filter circuit (in a broad sense, a signal extracting circuit) 40 which extracts a signal in the predetermined spatial frequency band from the brightness component of the image signal, and the brightness signal correction amount calculating circuit 250 may include a table which outputs the amount of correction of the brightness component corresponding to the output of the multi-stage filter circuit 40 and the level of the brightness component before correction. In addition, the amount of correction output from the table is output as the correction signal VA.

According to the third embodiment, not only can the brightness signal be corrected, but also the color difference signal can be corrected simultaneously with the brightness signal, similar to the first or second embodiment. As a result, since it is possible to avoid the situation where the chromaticity of each pixel changes according to the amount of correction of the brightness signal and the tendency of the overall colors on the screen accordingly changes, the tendency of the colors on the whole screen can be maintained when expressing the detail of the image. Moreover, similar to the first or second embodiment, when the test image shown in FIG. 14 has been input, an image is displayed in which the AC component of the brightness is not uniform over the predetermined brightness level range of the predetermined spatial frequency band.

In addition, according to the third embodiment, the multipliers and the adder provided in the brightness signal correction amount calculating circuit can be removed compared with the first or second embodiment. As a result, it becomes possible to significantly reduce power consumption and cost.

Having described the image processor, the image display device, the image processing method, and the image display method of the invention on the basis of the above embodiments, the invention is not limited to the above-described embodiments, and various modifications thereof may be made within the scope without departing from the subject matter or spirit of the invention. For example, the following modifications may also be made.

(1) In each of the embodiments described above, the projector was used as an example of the image display device. However, the invention is not limited thereto. The image display device of the invention may also be applied to all kinds of devices which perform image display, such as a liquid crystal display device, a plasma display device, and an organic EL display device.

(2) In each of the embodiments described above, the light valve using a transmissive liquid crystal panel was used as a light modulating device. However, the invention is not limited thereto. For example, a DLP (digital light processing; registered trademark), a LCOS (liquid crystal on silicon), and the like may be adopted as light modulating devices.

(3) In each of the embodiments described above, the light valve using a so-called three plate type transmissive liquid crystal panel was used as an example of the light modulating device. However, a light valve using a single plate type liquid crystal panel or a two or four or more plate type transmissive liquid crystal panel may also be adopted.

(4) In each of the embodiments described above, one pixel was formed by sub-pixels of three color components. However, the invention is not limited thereto. The number of color components which form one pixel may be 2 or 4 or more.

(5) In each of the embodiments described above, the invention was described as the image processor, the image display device, the image processing method, and the image display method. However, the invention is not limited thereto. For example, the invention may be an image display system including the image processor or the image display device. In addition, for example, the invention may be a program, in which the procedure of the processing method (image processing method) of an image processor for realizing the invention or the procedure of the processing method (image display method) of an image display device for realizing the invention is described, or a recording medium recorded with the program.

The entire disclosure of Japanese Patent Application NO. 2008-229476, filed Sep. 8, 2008 is expressly incorporated by reference herein.

What is claimed is:

1. An image processor that corrects an image signal, the image processor comprising:
    a memory that stores an unextracted brightness component of the image signal;
    a signal extracting circuit that extracts a signal in a predetermined spatial frequency band from the unextracted brightness component of the image signal;
    a brightness component correction amount calculating section that receives the signal in the predetermined spatial frequency band extracted by the signal extracting circuit and that receives the unextracted brightness component of the image signal, the brightness component correction amount calculating section calculating an amount of correction of the unextracted brightness component of the image signal only for the signal in the predetermined spatial frequency band extracted by the signal extracting circuit; and
    a brightness component correcting section that receives the amount of correction calculated by the brightness component correction amount calculating section and the unextracted brightness component of the image signal and that corrects the unextracted brightness component of the image signal by using the amount of correction calculated by the brightness component correction amount calculating section,
    wherein the brightness component correction amount calculating section includes a brightness gain calculating circuit that receives the unextracted brightness component of the image signal directly from the memory, the brightness gain calculating circuit calculating a brightness gain corresponding to the level of the unextracted brightness component of the image signal, and
    wherein the brightness component correction amount calculating section calculates the amount of correction of the unextracted brightness component on the basis of the signal in the predetermined spatial frequency band extracted by the signal extracting circuit and the brightness gain calculated by the brightness gain calculating circuit.

2. The image processor according to claim 1, further comprising:
    a color difference component correcting section which corrects a color difference component of the image signal such that the value of xy chromaticity does not change before and after correction using the brightness component correcting section.

3. The image processor according to claim 2, further comprising:
    a color difference component correction amount calculating section which calculates the amount of correction of the color difference component of the image signal such that the value of xy chromaticity does not change, on the basis of brightness components of the image signal before and after correction using the brightness component correcting section,
    wherein the color difference component correcting section corrects the color difference component of the image signal by using the amount of correction of the color difference component calculated by the color difference component correction amount calculating section.

4. The image processor according to claim 3, further comprising:
    an adjustment parameter storage section that stores an adjustment parameter of the color difference component, wherein assuming that the unextracted brightness component before correction is Yin, the unextracted brightness component after correction is Yout, and the adjustment parameter is b, the color difference component correcting section corrects the color difference component by multiplying the color difference component of the image signal by a color difference gain of (1−b×(1−Yout/Yin)).

5. The image processor according to claim 1,
wherein the signal extracting circuit is a multi-stage filter circuit that extracts the signal in the predetermined spatial frequency band from the unextracted brightness component of the image signal,
wherein the brightness component correction amount calculating section includes (1), in the brightness gain calculating circuit, a plurality of tables which is provided for every output of the multi-stage filter circuit and outputs a gain corresponding to the level of the unextracted brightness component before correction, (2) a plurality of multipliers which is provided for every output of the multi-stage filter circuit and performs multiplication of the output of the multi-stage filter circuit and the output of each of the plurality of tables, and (3) an adder which adds the multiplication results of the plurality of multipliers and calculates an output of the adder as the amount of correction of the unextracted brightness component.

6. The image processor according to claim 1, wherein the brightness component correction amount calculating section includes a table which outputs the amount of correction of the unextracted brightness component corresponding to the output of the signal extracting circuit and the level of the unextracted brightness component before correction.

7. An image display device that displays an image on the basis of an image signal, comprising:
the image processor according to claim 1 that corrects the image signal; and
an image display unit that displays an image on the basis of the image signal corrected by the image processor.

8. An image processor that corrects an image signal, the image processor comprising:
a memory that stores an unextracted brightness component of the image signal;
a signal extracting circuit that extracts a signal in a predetermined spatial frequency band from the unextracted brightness component of the image signal;
a brightness component correction amount calculating section that receives the signal in the predetermined spatial frequency band extracted by the signal extracting circuit and that receives the unextracted brightness component of the image signal, the brightness component correction amount calculating section calculating an amount of correction of the unextracted brightness component of the image signal only for the signal in the predetermined spatial frequency band extracted by the signal extracting circuit; and
a brightness component correcting section that receives the amount of correction calculated by the brightness component correction amount calculating section and the unextracted brightness component of the image signal and that corrects the unextracted brightness component of the image signal by using the amount of correction calculated by the brightness component correction amount calculating section,
wherein the brightness component correction amount calculating section includes a brightness gain calculating circuit that receives the unextracted brightness component of the image signal directly from the memory, the brightness gain calculating circuit calculating a brightness gain corresponding to the level of the unextracted brightness component of the image signal,
wherein the brightness component correction amount calculating section calculates the amount of correction of the unextracted brightness component on the basis of the signal in the predetermined spatial frequency band extracted by the signal extracting circuit and the brightness gain calculated by the brightness gain calculating circuit, and
wherein the amount of correction in a region having a predetermined brightness level is larger than the amount of correction in another region.

9. An image processing method of correcting an image signal, the method comprising:
extracting, by a signal extracting unit, a signal in a predetermined spatial frequency band from an unextracted brightness component of the image signal;
calculating, by a brightness component correction amount calculating unit that receives the signal in the predetermined spatial frequency band extracted by the extracting step and that receives the unextracted brightness component of the image signal, an amount of correction of the unextracted brightness component of the image signal only for the signal in the predetermined spatial frequency band extracted by the extracting step; and
correcting, by a brightness component correcting unit that receives the amount of correction calculated by the calculating step and that receives the unextracted brightness component of the image signal, the unextracted brightness component of the image signal by using the amount of correction calculated in the calculating of the amount of correction of the brightness component,
wherein the calculating step includes calculating a brightness gain by a brightness gain calculating unit that receives the unextracted brightness component of the image signal directly from a memory that stores the unextracted brightness component of the image signal, the brightness gain corresponding to the level of the unextracted brightness component of the image signal, and
wherein the calculating step is performed on the basis of the signal in the predetermined spatial frequency band extracted by the extracting step and the brightness gain calculated by the calculating step.

10. The image processing method according to claim 9, further comprising:
correcting a color difference component of the image signal such that the value of xy chromaticity does not change before and after correction in the correcting of the brightness component.

11. The image processing method according to claim 9, further comprising:
calculating the amount of correction of the color difference component of the image signal such that the value of xy chromaticity does not change, on the basis of brightness components of the image signal before and after correction in the correcting of the brightness component,
wherein in the correcting of the color difference component, the color difference component of the image signal is corrected using the amount of correction of the color difference component calculated in the calculating of the amount of correction of the color difference component.

12. An image display method of displaying an image on the basis of an image signal, the method comprising:

extracting, by a signal extracting unit, a signal in a predetermined spatial frequency band from an unextracted brightness component of the image signal;

calculating, by a brightness component correction amount calculating unit that receives the signal in the predetermined spatial frequency band extracted by the extracting step and that receives the unextracted brightness component of the image signal, an amount of correction of the unextracted brightness component of the image signal only for the signal in the predetermined spatial frequency band extracted by the extracting step;

correcting, by a brightness component correcting unit that receives the amount of correction calculated by the calculating step and that receives the unextracted brightness component of the image signal, the unextracted brightness component of the image signal by using the amount of correction calculated in the calculating of the amount of correction of the brightness component; and displaying, by an image display unit, an image on the basis of the image signal corrected in the correcting of the brightness component, wherein the calculating step includes calculating a brightness gain by a brightness gain calculating unit that receives the unextracted brightness component of the image signal directly from a memory that stores the unextracted brightness component of the image signal, the brightness gain corresponding to the level of the unextracted brightness component of the image signal, and wherein the calculating step is performed on the basis of the signal in the predetermined spatial frequency band extracted by the extracting step and the brightness gain calculated by the calculating step.

13. An image display method of displaying an image on the basis of an image signal, the method comprising:

extracting, by a signal extracting unit, a signal in a predetermined spatial frequency band from an unextracted brightness component of the image signal;

calculating, by a brightness component correction amount calculating unit that receives the signal in the predetermined spatial frequency band extracted by the extracting step and that receives the unextracted brightness component of the image signal, an amount of correction of the unextracted brightness component of the image signal in the predetermined spatial frequency band extracted by the extracting step;

correcting, by a brightness component correcting unit that receives the amount of correction calculated by the calculating step and that receives the unextracted brightness component of the image signal, the unextracted brightness component of the image signal by using the amount of correction calculated in the calculating of the amount of correction of the brightness component; and displaying, by an image display unit, an image on the basis of the image signal corrected in the correcting of the brightness component, wherein the calculating step includes calculating a brightness gain by a brightness gain calculating unit that receives the unextracted brightness component of the image signal directly from a memory that stores the unextracted brightness component of the image signal, the brightness gain corresponding to the level of the unextracted brightness component of the image signal, wherein the calculating step is performed on the basis of the signal in the predetermined spatial frequency band extracted by the extracting step and the brightness gain calculated by the calculating step, and wherein the amount of correction in a region having a predetermined brightness level is larger than the amount of correction in another region.

* * * * *